United States Patent
Tchoryk, Jr. et al.

(10) Patent No.: US 7,857,261 B2
(45) Date of Patent: Dec. 28, 2010

(54) DOCKING SYSTEM

(75) Inventors: Peter Tchoryk, Jr., Ann Arbor, MI (US); Jane Camile Pavlich, Ann Arbor, MI (US); Anthony Beckman Hays, Jackson, MI (US); Gregory Joseph Wassick, Petersburg, MI (US); Greg Ritter, Hamburg, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 1075 days.

(21) Appl. No.: 11/531,261

(22) Filed: Sep. 12, 2006

(65) Prior Publication Data

US 2007/0210212 A1 Sep. 13, 2007

Related U.S. Application Data

(63) Continuation-in-part of application No. 10/421,492, filed on Apr. 23, 2003, now Pat. No. 7,104,505, and a continuation-in-part of application No. 10/286,192, filed on Nov. 1, 2002, now Pat. No. 6,742,745.

(60) Provisional application No. 60/416,138, filed on Oct. 4, 2002, provisional application No. 60/335,563, filed on Nov. 1, 2001.

(51) Int. Cl.
*B64G 1/64* (2006.01)
*B63B 21/62* (2006.01)
*B60D 1/01* (2006.01)

(52) U.S. Cl. .................... 244/172.4; 114/249; 280/514; 403/361

(58) Field of Classification Search ................ 244/115, 244/172.4; 114/249, 250; 24/305; 280/514; 403/361
See application file for complete search history.

(56) References Cited

U.S. PATENT DOCUMENTS

| 2,199,588 | A |   | 5/1940 | Cobham et al. |
| 2,716,527 | A |   | 8/1955 | Latimer-Needham |
| 2,761,636 | A |   | 9/1956 | Finlay |
| 3,009,729 | A |   | 11/1961 | Eakin |
| 3,201,065 | A |   | 8/1965 | Dunn |
| 3,389,877 | A |   | 6/1968 | Huber et al. |
| 3,478,986 | A |   | 11/1969 | Fogarty |
| 3,508,723 | A |   | 4/1970 | Warren et al. |
| 3,608,848 | A |   | 9/1971 | Cantor et al. |
| 3,737,117 | A |   | 6/1973 | Belew |
| 3,753,536 | A |   | 8/1973 | White |
| 3,809,002 | A |   | 5/1974 | Nagy et al. |
| 3,938,461 | A | * | 2/1976 | Marriner ................ 114/249 |
| 4,083,520 | A |   | 4/1978 | Rupp et al. |

(Continued)

OTHER PUBLICATIONS

Tchoryk Jr., P.; M.E. Dobbs, D.J. Apley, D.J. Conrad, M.P. Frazer, D.K. Slayton, "Autonomous Rendezvous and Docking Using an Expendable Launch Vehicle," AIAA/Utah State University Conference on Small Satellites, Poster Paper, Logan, Utah, Aug. 27-29, 1991.

(Continued)

*Primary Examiner*—Rob Swiatek
(74) *Attorney, Agent, or Firm*—Raggio & Dinnin, P.C.

(57) ABSTRACT

An automatically aligned docking system, comprises a multi-point kinematic rigidization system that provides precise, repeatable rotational alignment at the spacecraft-docking interface without over-constraining the interface.

22 Claims, 20 Drawing Sheets

U.S. PATENT DOCUMENTS

| | | | |
|---|---|---|---|
| 4,119,051 | A | 10/1978 | Orndorff, Jr. |
| 4,177,964 | A | 12/1979 | Hujsak et al. |
| 4,195,804 | A | 4/1980 | Hujsak et al. |
| 4,381,092 | A | 4/1983 | Barker |
| 4,391,423 | A | 7/1983 | Pruett et al. |
| 4,431,333 | A | 2/1984 | Chandler |
| 4,500,057 | A | 2/1985 | Duweiz |
| 4,573,725 | A | 3/1986 | Griffiths |
| 4,588,150 | A | 5/1986 | Bock et al. |
| 4,607,815 | A * | 8/1986 | Turci et al. ............... 244/172.4 |
| 4,709,454 | A | 12/1987 | Barnes |
| 4,712,753 | A | 12/1987 | Howard |
| 4,906,123 | A | 3/1990 | Weskamp et al. |
| 4,964,596 | A * | 10/1990 | Ganssle et al. ........... 244/172.5 |
| 5,253,944 | A | 10/1993 | Preston |
| 5,364,046 | A | 11/1994 | Dobbs et al. |
| 5,429,328 | A | 7/1995 | Dobbs et al. |
| 5,735,488 | A | 4/1998 | Schneider |
| 6,299,107 | B1 | 10/2001 | Kong et al. |
| 6,742,745 | B2 | 6/2004 | Tchoryk et al. |
| 6,767,155 | B2 | 7/2004 | O'Brien et al. |
| 6,935,805 | B2 | 8/2005 | O'Brien et al. |
| 6,969,030 | B1 | 11/2005 | Jones et al. |
| 7,104,505 | B2 | 9/2006 | Tchoryk et al. |
| 7,374,134 | B2 | 5/2008 | Collyer et al. |
| 2004/0245405 | A1 | 12/2004 | Tchoryk et al. |
| 2005/0263649 | A1 | 12/2005 | Ritter et al. |
| 2009/0146011 | A1 | 6/2009 | Ritter et al. |
| 2009/0173832 | A1 | 7/2009 | Hays et al. |
| 2009/0173833 | A1 | 7/2009 | Ritter et al. |

OTHER PUBLICATIONS

Quintero, Montgomery, Tchoryk, "Autonomous Rendezvous and Docking Scenarios for Guidelines and Standards," AIAA Space Programs Conference Proceedings, Huntsville, AL, Sep. 21-23, 1993.

Tchoryk Jr., P.; A. Hays, J. Pavlich, G. Ritter, G. Wassick, C. Nardell, G. Sypitkowski, "Autonomous Satellite Docking System," AIAA 2001-4527, AIAA Space 2001 Conference and Exhibition, Albuquerque, NM, Aug. 28-30, 2001.

Tchoryk Jr., P., A. Hays, J. Pavlich, "Modeling and Simulation of an Autonomous Satellite Docking System," AIAA 2001 Core Technologies for Space Systems Conference, Nov. 28-30, 2001, Colorado Springs, CO.

Tchoryk Jr., P.; Anthony B. Hays, Jane C. Pavlich; "A Docking Solution for On-Orbit Satellite Servicing: Part of the Responsive Space Equation," AIAA-LA Section/SSTC 2003-2001 Responsive Space Conference Apr. 1-3, 2003.

Hays, A. B.; P. Tchoryk, Jr., J. Pavlich, G. Wassick, "Dynamic Simulation and Validation of a Satellite Docking System," SPIE AeroSense Symposium, Space Systems Technology and Operations Conference, Orlando, FL, Apr. 21-25, 2003.

Pavlich, J.; P. Tchoryk, Jr., A. Hays, G. Wassick, "KC-135 Zero-G Testing of a Micro-Satellite Docking Mechanism," SPIE AeroSense Symposium, Space Systems Technology and Operations Conference, Orlando, FL, Apr. 21-25, 2003.

Hays, A., Dynamic Simulation Makes a Connection, Aerospace Engineering, SAE Publications, Nov. 2003, p. 77.

Hays, A. B.; P. Tchoryk, Jr., J. C. Pavlich, G. A. Ritter, G. J. Wassick; Advancements in KC-135 microgravity testing satellite docking system, Proceedings of SPIE, Vol. 5419, Spacecraft Platforms and Infrastructure, Peter Tchoryk, Jr., Melissa Write, Editors, Aug. 2004, pp. 119-129.

Hays, A. B.; P. Tchoryk, Jr., J. C. Pavlich, Greg A. Ritter, Gregory J. Wassick; Advancements in design of an autonomous satellite docking system, Proceedings of SPIE, vol. 5419, Spacecraft Platforms and Infrastructure, Peter Tchoryk, Jr., Melissa Write, Editors, Aug. 2004, pp. 107-118.

USPTO Office Action in U.S. Appl. No. 10/857,808, Dec. 17, 2004, 5 pages.

Ritter et al., Docking System, U.S. Appl. No. 12/409,468 filed on Mar. 23, 2009, 53 pages.

USPTO Office Action in U.S. Appl. No. 12/406,955, including references cited by Examiner, Search Information, Examiner's search strategy and results, Bibiographic Data Sheet, References cited by applicant and considered by Examiner, Mar. 15, 2010, 26 pages.

USPTO Office Action in U.S. Appl. No. 12/409,456, including references cited by Examiner, Search Information, References cited by applicant and considered by Examiner, Jun. 11, 2010, 15 pages.

Schedules and Lingering Worries, http://history.nasa.gov/SP-4205/ch12-2.html, 4 pages, cited by Examiner in Jun. 11, 2010 USPTO Office Action in U.S. Appl. No. 12/409,456.

* cited by examiner

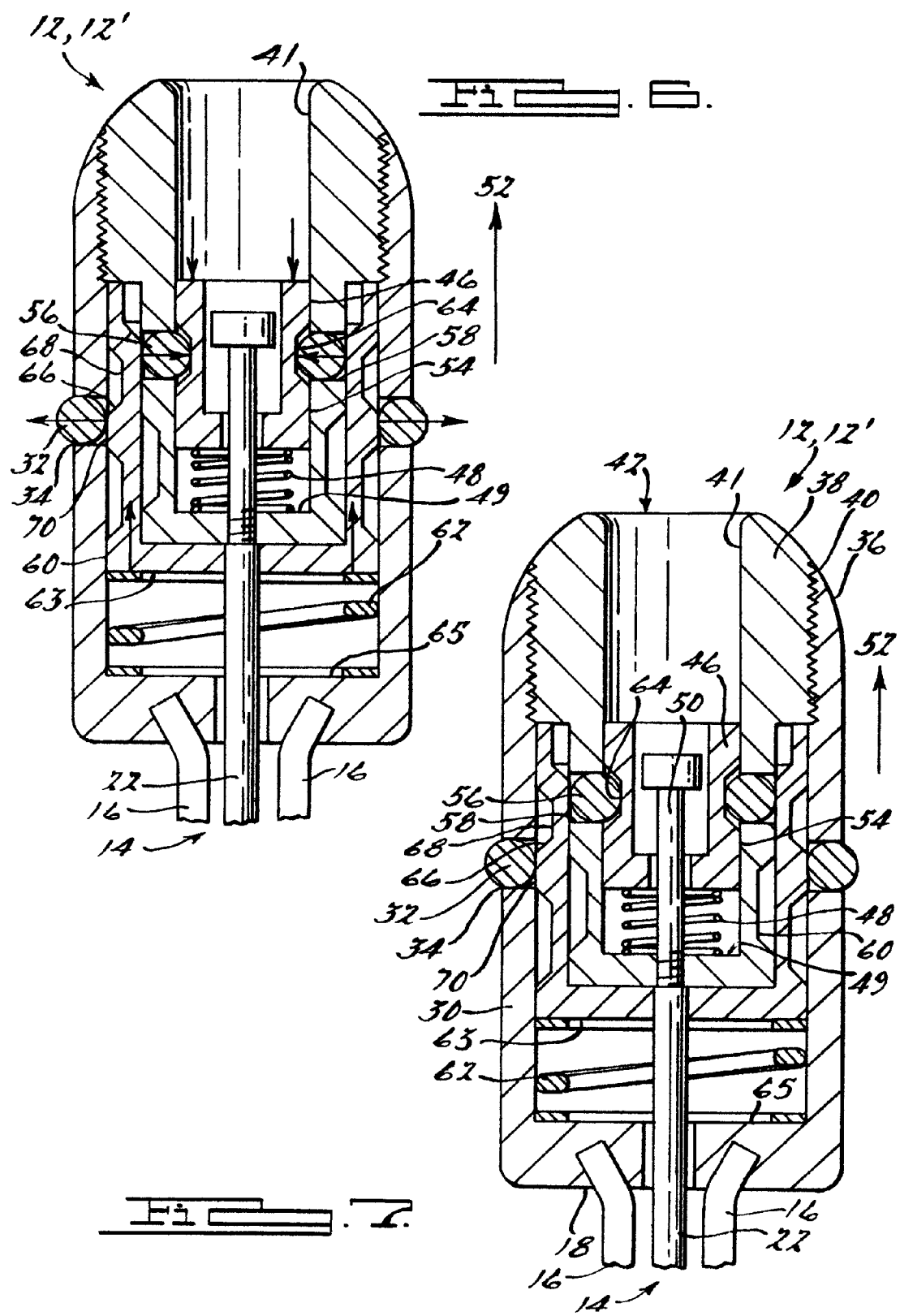

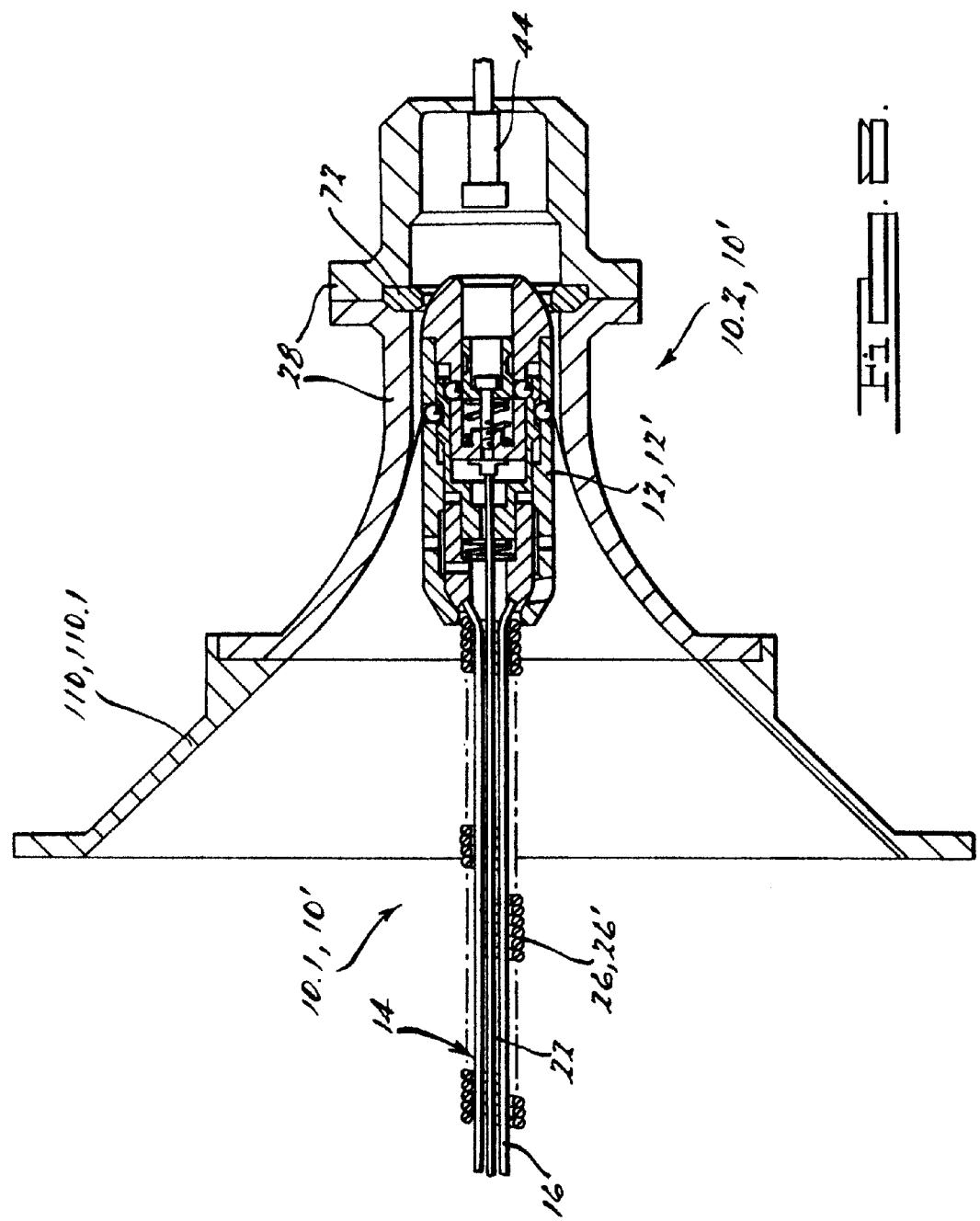

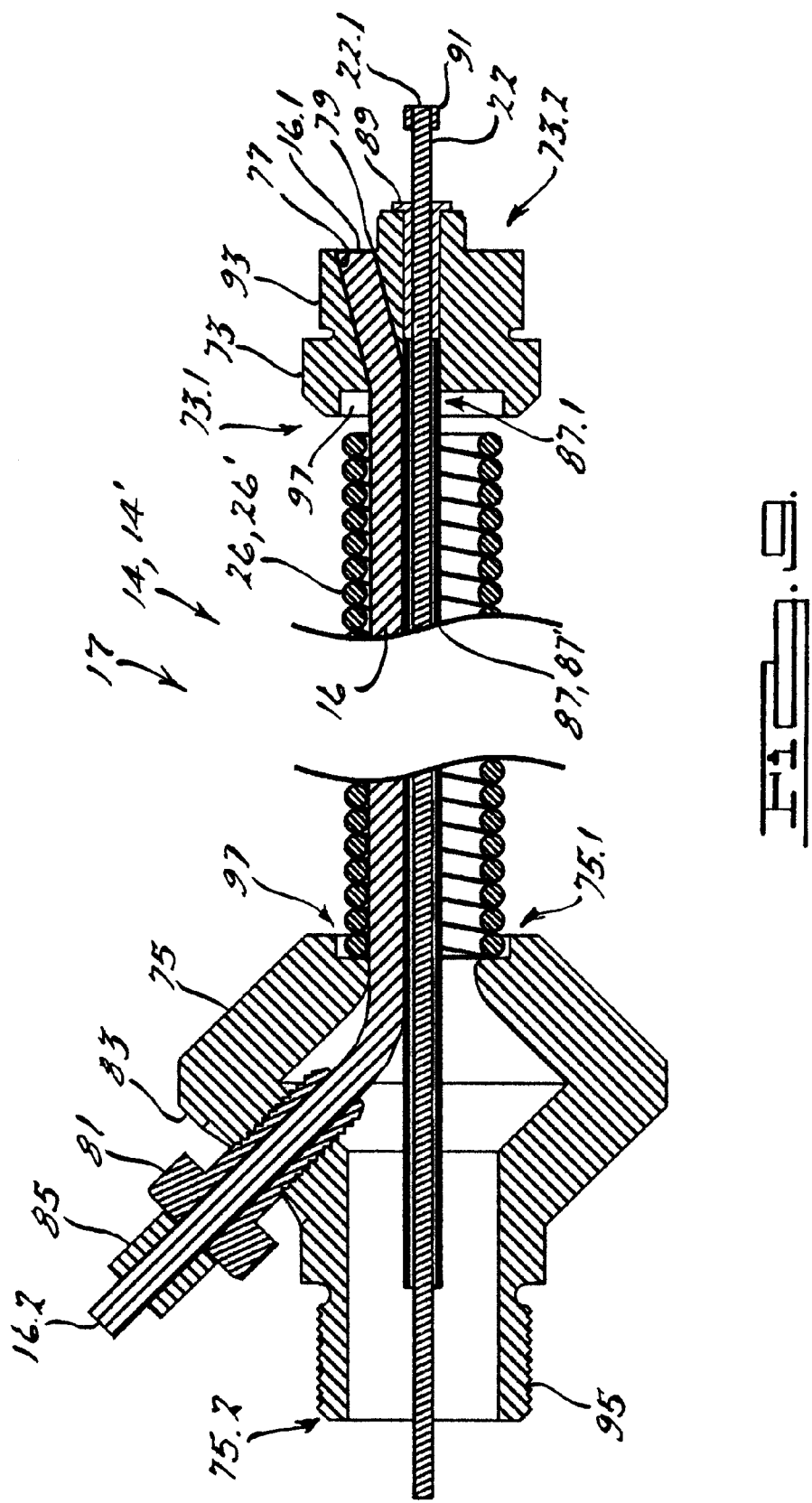

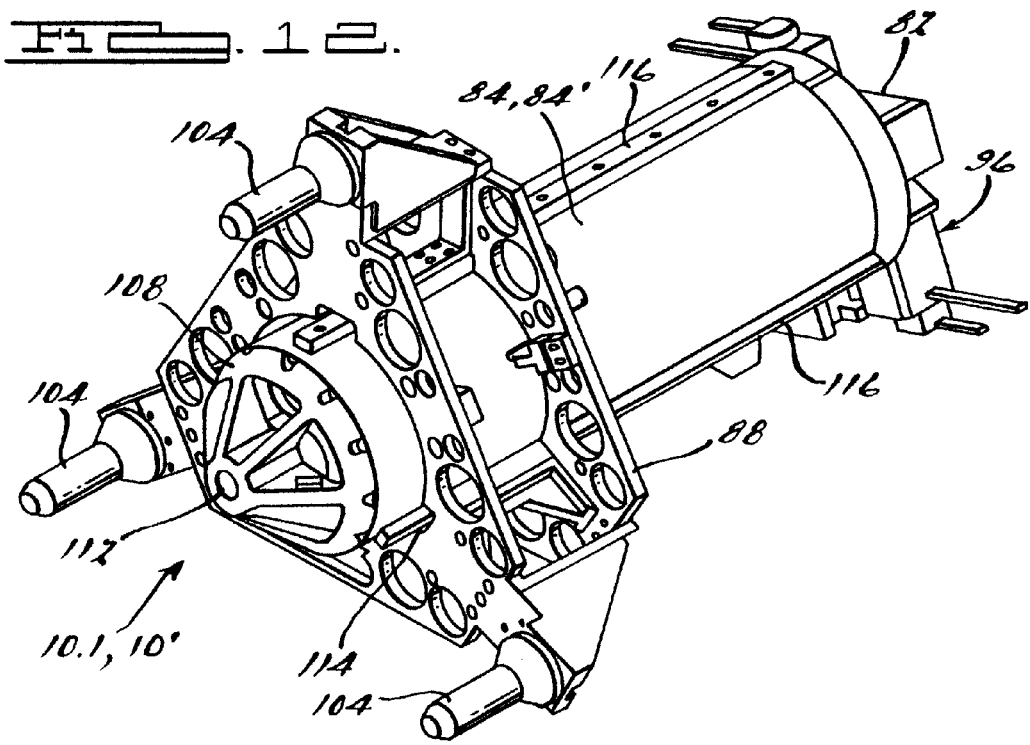
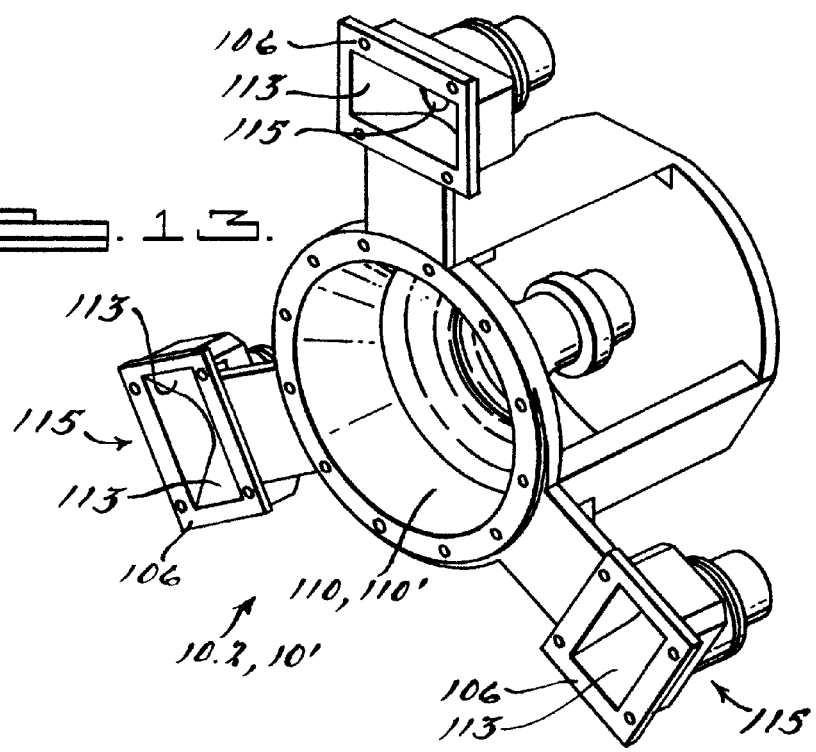

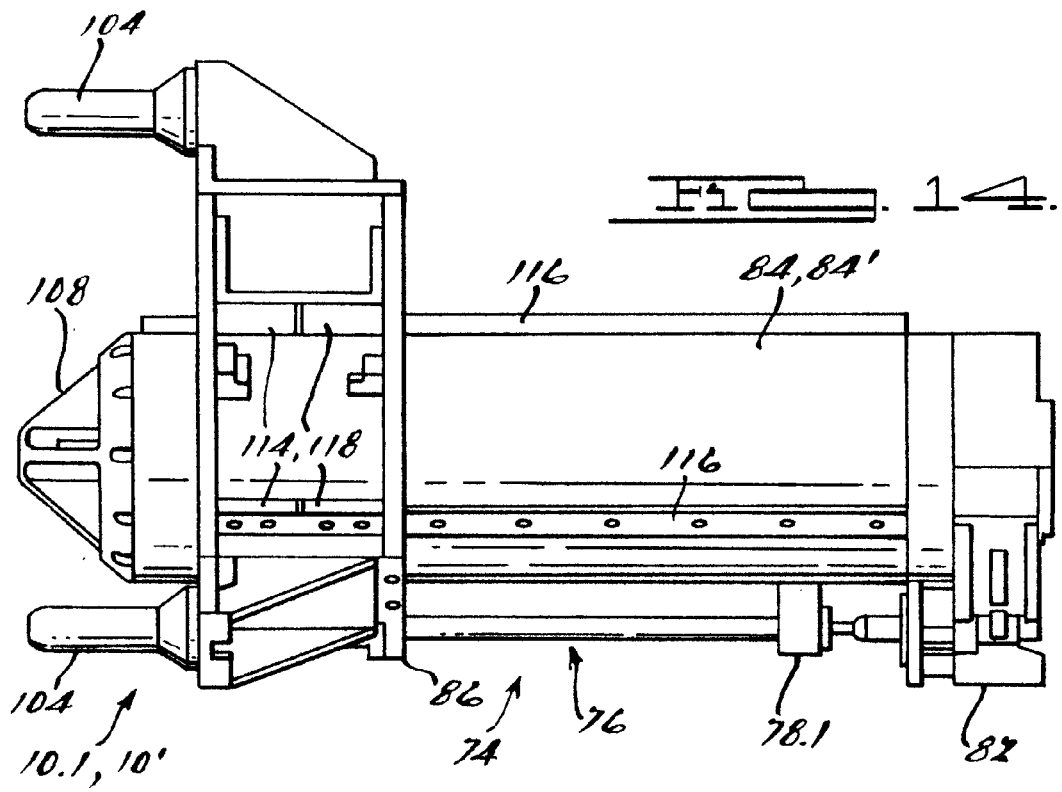
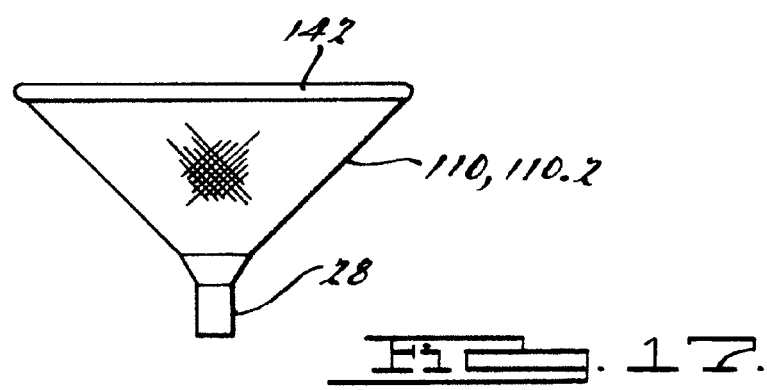

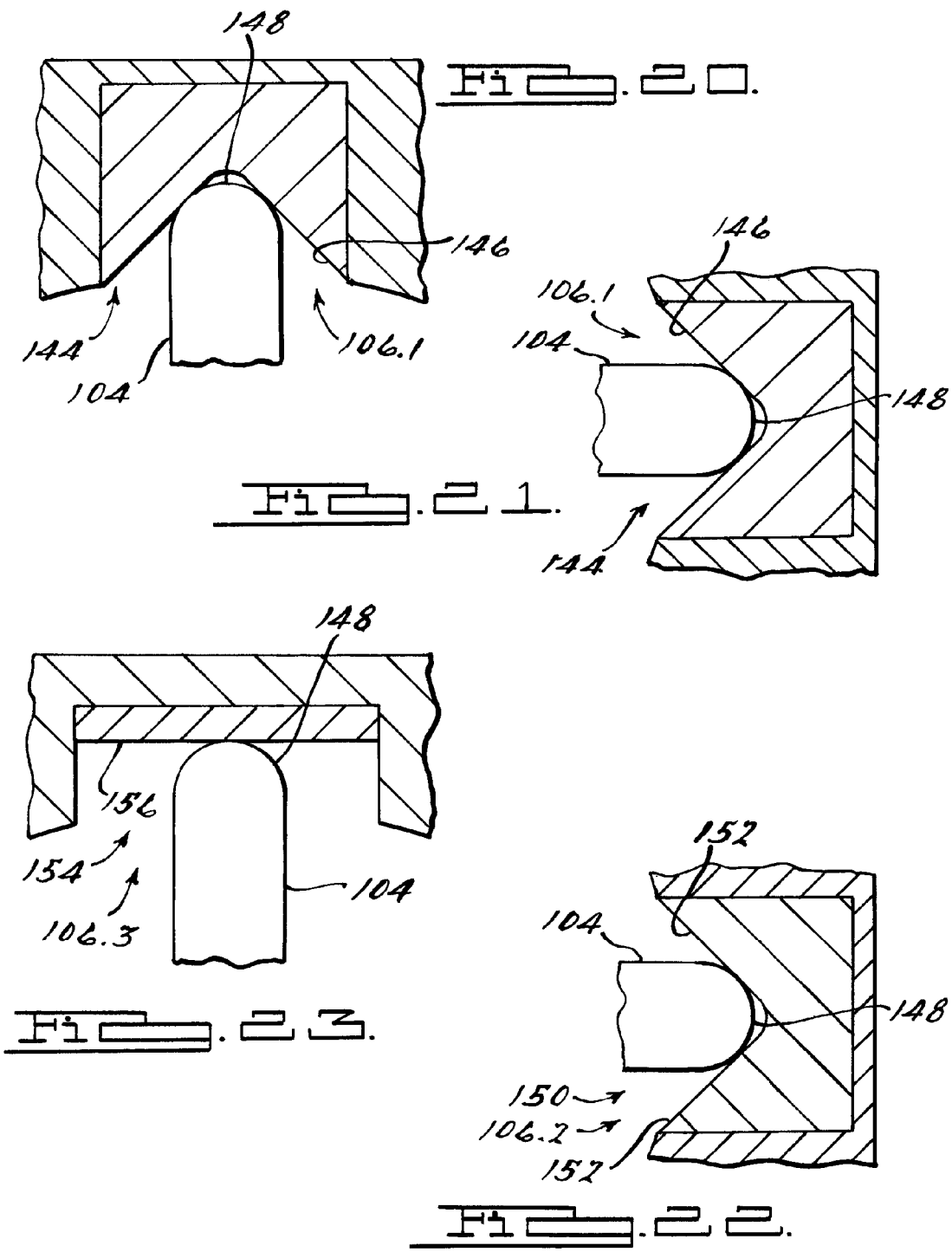

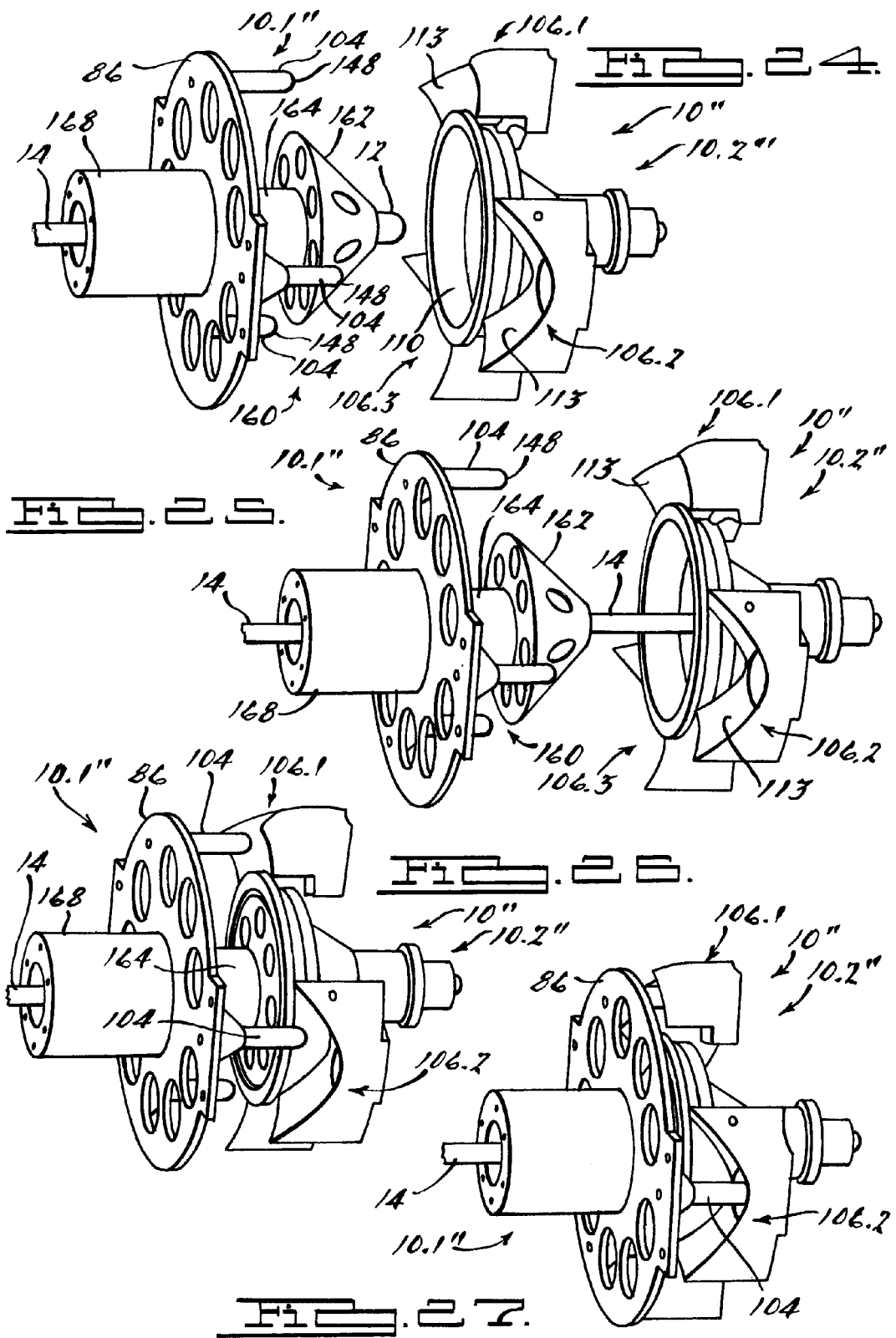

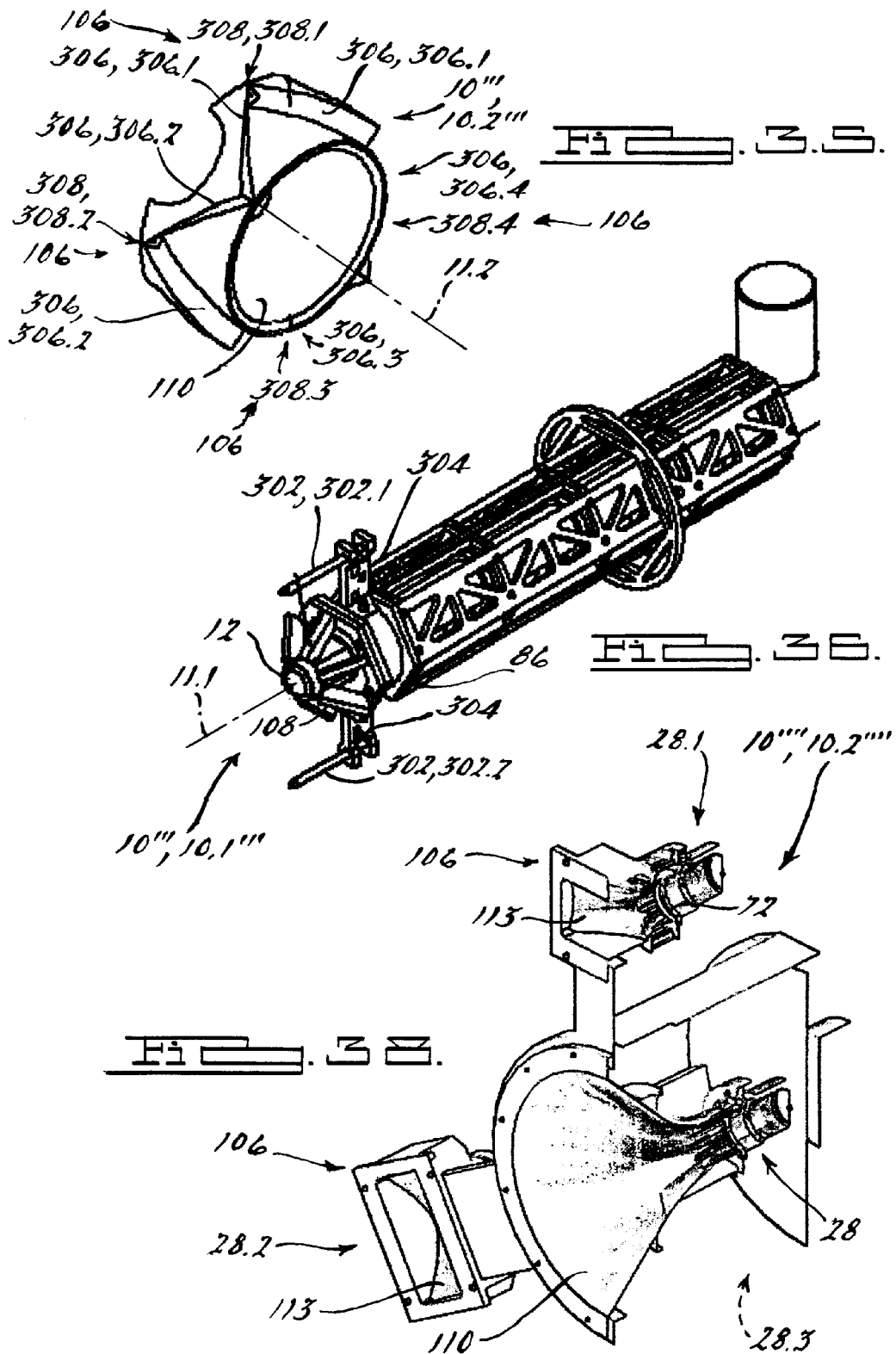

DOCKING SYSTEM

STATEMENT REGARDING FEDERALLY SPONSORED RESEARCH OR DEVELOPMENT

This invention was made with Government support under Contract Nos. DAAH01-00-C-R012 and DAAH01-01-C-R015 awarded by the U.S. Army Aviation and Missile Command, with funding from the Defense Advanced Research Projects Agency (DARPA); and with Government support under Contract No. F29601-02-C-0007 awarded by the U.S. Air Force. The Government has certain rights in this invention.

CROSS-REFERENCE TO RELATED APPLICATIONS

The instant application is a continuation-in-part of U.S. patent application Ser. No. 10/421,492, filed on Apr. 23, 2003, now U.S. Pat. No. 7,104,505, which claims benefit of priority from U.S. Provisional Patent Application Ser. No. 60/416,138, filed on Oct. 4, 2002. U.S. patent application Ser. No. 10/421,492 is a continuation-in-part of U.S. patent application Ser. No. 10/286,192, filed on Nov. 1, 2002, now U.S. Pat. No. 6,742,745, which claims benefit of priority from U.S. Provisional Patent Application Ser. No. 60/335,563, filed on Nov. 1, 2001. U.S. application Ser. No. 10/857,808, filed on Jun. 1, 2004 as a continuation of U.S. patent application Ser. No. 10/421,492, was abandoned in favor of the instant application. The entire content of each of the above-referenced applications is incorporated herein by reference.

BRIEF DESCRIPTION OF THE DRAWINGS

FIG. 1b illustrates a view of a docking-face of the chase vehicle illustrated in FIG. 1a;

FIG. 1c illustrates a view of a docking-face of the target vehicle illustrated in FIG. 1a;

FIG. 6 illustrates an actuation of the Harpoon end effector;

FIG. 7 illustrates the Harpoon end effector in a deployed state;

FIG. 8 illustrates the Harpoon end effector in cooperation with an associated primary target receptacle;

FIG. 9 illustrates an embodiment of a docking cable assembly;

FIG. 12 illustrates an embodiment of a chaser portion of an autonomous satellite docking system (ASDS);

FIG. 13 illustrates an embodiment of a target portion of an autonomous satellite docking system (ASDS);

FIG. 17 illustrates an alternative target cone comprising a fabric material;

FIGS. 20 and 21 illustrate cross-sectional views of a secondary target receptacle incorporating a conical detent pocket with an associated concave conical surface;

FIG. 22 illustrates a cross-sectional view of a secondary target receptacle incorporating a V-shaped groove pocket with associated sloped planar surfaces;

FIG. 23 illustrates a cross-sectional view of a secondary target receptacle incorporating a flat-bottomed pocket with an associated planar surface;

FIGS. 24-27 illustrate a docking sequence of the second aspect of the docking system;

FIG. 32 illustrates an associated linear actuator driven cable actuation system of the prior art docking system;

FIG. 35 illustrates a third aspect of a target portion of a docking system;

FIG. 36 illustrates a third d aspect of a chaser portion of a docking system;

FIG. 37 illustrates a fourth aspect of a chaser portion of a docking system; and FIG. 38 illustrates a third aspect of a target portion of a docking system.

DETAILED DESCRIPTION OF EMBODIMENT(S)

Figure 1A:
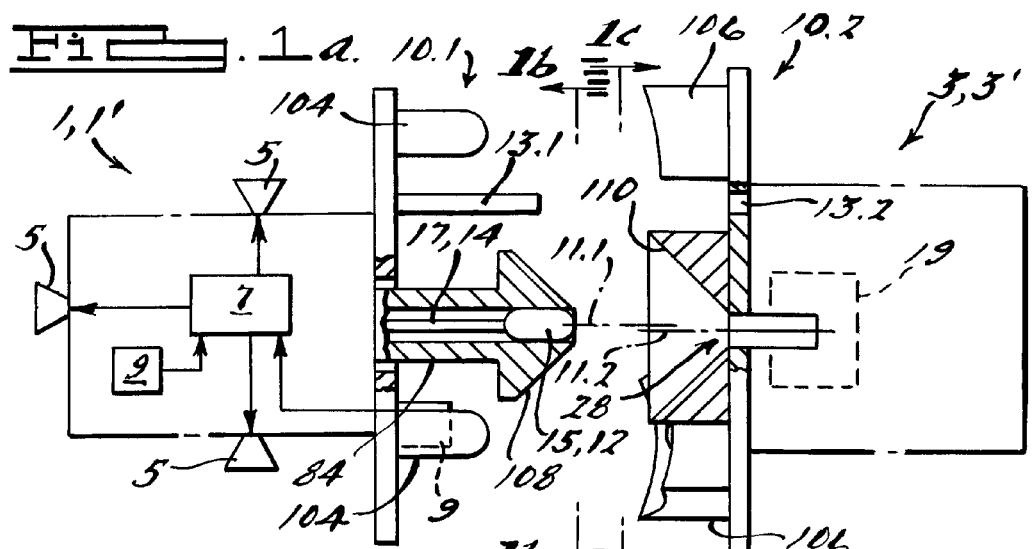
FIG. 1a illustrates a side view of chase and target vehicles prior to docking.

Referring to FIG. 1a, chase 1 and target 3 vehicles, for example, spacecraft 1', 3' or underwater vehicles adapted to dock with one another, are illustrated in proximity to one another prior to docking. During a docking operation, the chase 1 and target 3 vehicles become releasably coupled to one another so as to provide for transferring cargo, materials, energy (e.g. electrical or chemical/fuel), signals or people therebetween, for example, so as to provide for the chase vehicle 1 to either service the target vehicle 3, or to provide for the recovery of a payload from, or constituting, the target vehicle 3. In some cases, the target vehicle 3 may not be able to contribute any active control over the docking process, wherein all of the active elements associated with docking would be located in or on the chase vehicle 1, with corresponding passive elements, adapted to cooperate therewith, located in or on the target vehicle 3. For example, the chase vehicle 1—under active control, either autonomously, by man, or a combination thereof—might pursue the target vehicle 3 in preparation for docking, for example, using various thrusters 5 under control of a processor 7 under control of or a part of an autonomous guidance, navigation and control system 9, so as to provide for sufficiently aligning the chase vehicle 1 with the target vehicle 3 in preparation for docking.

The chase 1 and target 3 vehicles respectively incorporate first 10.1 and second 10.2 portions of a docking system 10, which are adapted to be releasably coupled to one another, the first portion 10.1 of which, also known as the chaser portion 10.1, is operatively coupled to the chase vehicle 1, and the second portion 10.1 of which, also known as the target portion 10.2, is operatively coupled to the target vehicle 3. Each of first 10.1 and second 10.2 portions of the docking system 10 respectively have respective first 11.1 and second 11.2 roll axes, wherein the first roll axis 11.1 constitutes a central axis of the active elements of the chaser portion 10.1 of the docking system 10 that act substantially therealong, and the second roll axis 11.2 constitutes a central axis of the associated passive elements of the target portion 10.2 of the docking system 10. The chase vehicle 1 can be maneuvered so as to provide for aligning the first roll axis 11.1 thereof sufficiently with the second roll axis 11.2 of the target vehicle 3 so as to enable docking to be initiated. Thereafter, during the associated docking process, the first 11.1 and second 11.2 roll axes become further aligned with one another as a result of the interaction of the first 10.1 and second 10.2 portions of a docking system 10.

Figures 1B, 1C:
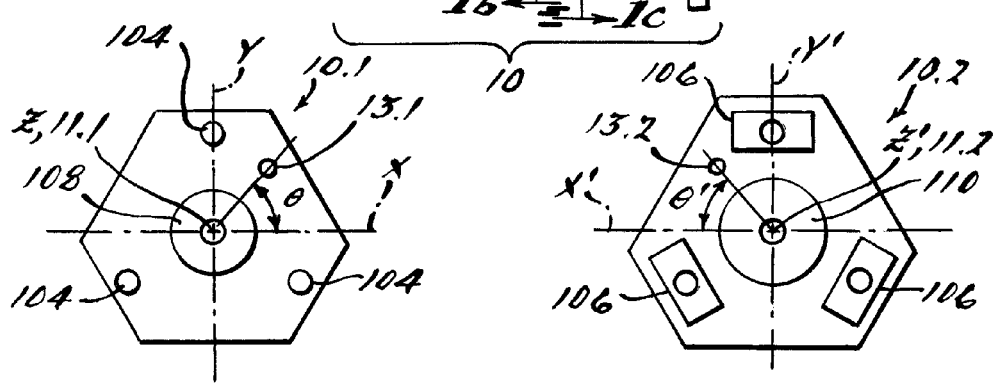

Referring also to FIGS. 1b and 1c, the chaser 10.1 and target 10.2 portions may be assigned respective Cartesian coordinate systems (X, Y, Z) and (X', Y' Z'), the Z and Z' axes of which are collinear with the first 11.1 and second 11.2 roll axes respectively. In addition to aligning the first 11.1 and second 11.2 roll axes during docking, it may also be necessary to provide for a rotational alignment ($\theta$, $\theta'$) of the chase 1 and target 3 vehicles relative to the first 11.1 and second 11.2 roll axes, for example, so as to provide for aligning material, fluid, electrical or information transfer devices or conduits 13.1, 13.2, or to provide for physically transferring payloads between the chase 1 and target 3 vehicles. Accordingly, during docking, the docking system 10 may, in general, provide for aligning the chase 1 and target 3 vehicles in both Cartesian (X, Y, Z) translation and in pitch, yaw and roll rotation relative to either of the first 11.1 and second 11.2 roll axes.

Each of the chase 1 and target 3 vehicles has an associated trajectory prior to docking, and in many cases, particularly for spacecraft 1', 3' operating in outer space, it is beneficial if the force of impact of one vehicle 1, 3, or portions thereof, upon the other vehicle 3, 1, is sufficiently small prior to coupling so as to not substantially perturb the trajectories of either the chase 1 or target 3 vehicles during the coupling process, so that the chase 1 and target 3 vehicles remain sufficiently aligned and proximate with respect to one another so as to enable completion of the docking process. Otherwise, the force of impact of the chase 1 and target 3 vehicles might cause the chase 1 and target 3 vehicles to be pushed away from one another by rebound prior to coupling.

Figure 2:
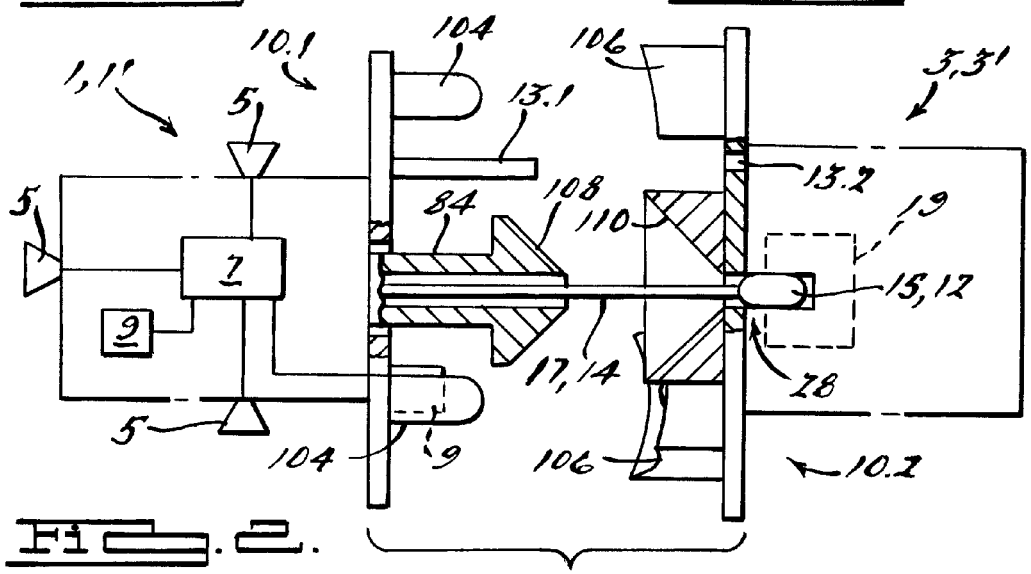
FIG. 2 illustrates the result of a soft-docking process.

Referring to FIG. 2, after an initial pursuit phase, with the chase vehicle 1 sufficiently close to the target vehicle 3 so as to provide for the initiation of docking therewith, the chase vehicle 1 commences what is referred to as a soft-docking process by extending a coupling element 15 coupled to an extendable tension element 17 coupled to the chase vehicle 1. The extendable tension element 17 is adapted to support a tensile force therein, but is otherwise relatively compliant in bending so as to not transmit substantial compressive or shear forces, or moments from one end to the other. For example, in one set of embodiments, the extendable tension element 17 comprises a docking cable 14. The coupling element 15 is extended from the chase vehicle 1 towards a primary target cone 110 that leads to a primary target receptacle 28 of the target vehicle 3, wherein the primary target cone 110 provides for guiding the coupling element 15 into the primary target receptacle 28 if initially misaligned therewith. After insertion therein, the coupling element 15 becomes coupled to the primary target receptacle 28, either by action of the coupling element 15 or by action of a coupling mechanism 19 associated with the primary target receptacle 28, so as to thereby mechanically couple the chase vehicle 1 to the target vehicle 3, resulting in what is referred to as a soft-dock. Accordingly, during the soft-docking process, the chase vehicle 1 is able to capture the target vehicle 3 without either the chase 1 or target 3 vehicles imparting a substantial force to the other, as a result of the compliant nature of the extendable tension element 17 used to couple the chase 1 and target 3 vehicles together.

Figure 3:
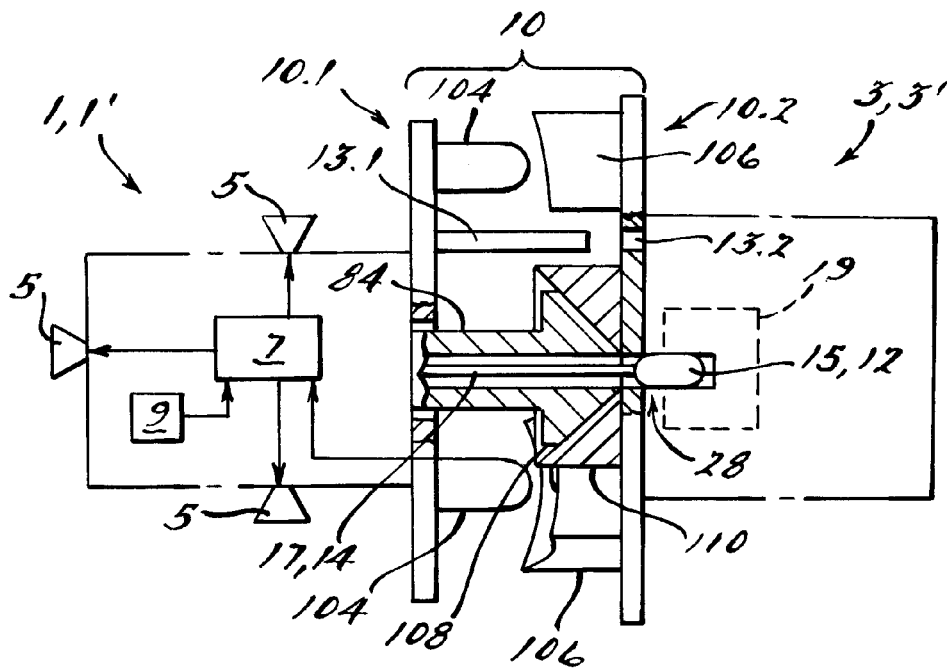
FIG. 3 illustrates the result of a hard-docking process.

Referring to FIG. 3, following the soft-docking process, the chase vehicle 1 establishes a relatively more rigid coupling between the chase 1 and target 3 vehicles by retracting the extendable tension element 17, thereby drawing the chase 1 and target 3 vehicles together until at least one relatively rigid portion of each abuts and presses against a corresponding at least one relatively rigid portion of the other, i.e. in what is referred to as a hard-docking process, resulting in what is referred to as a hard-dock. When hard-docked, the chase 1 and target 3 vehicles in combination kinematically substantially constitute a single body.

For example, in one embodiment, during the soft-docking process, the extendable tension element 17 is extended from an extendable main docking boom 84 of the chase vehicle 1, wherein the main docking boom 84 is adapted to be extended from or retracted into the chase vehicle 1, and the extendable tension element 17 is adapted to be extended therefrom or retracted thereinto. The distal end of the main docking boom 84 incorporates a boom head 108 which is adapted—for example, conically shaped—so as to provide for mating with the primary target cone 110. Accordingly, as the extendable tension element 17 is retracted into the main docking boom 84, the extendable tension element 17 pulls on the coupling element 15 coupled to the primary target receptacle 28 of the target vehicle 3, bringing the chase 1 and target 3 vehicles together until the boom head 108 of the chase vehicle 1 becomes seated in the primary target cone 110 of the target vehicle 3, resulting in a hard-dock of the chase 1 and target 3 vehicles, with the chase 1 and target 3 vehicles thereby connected together so as to kinematically become substantially a single combined body.

Figure 4:
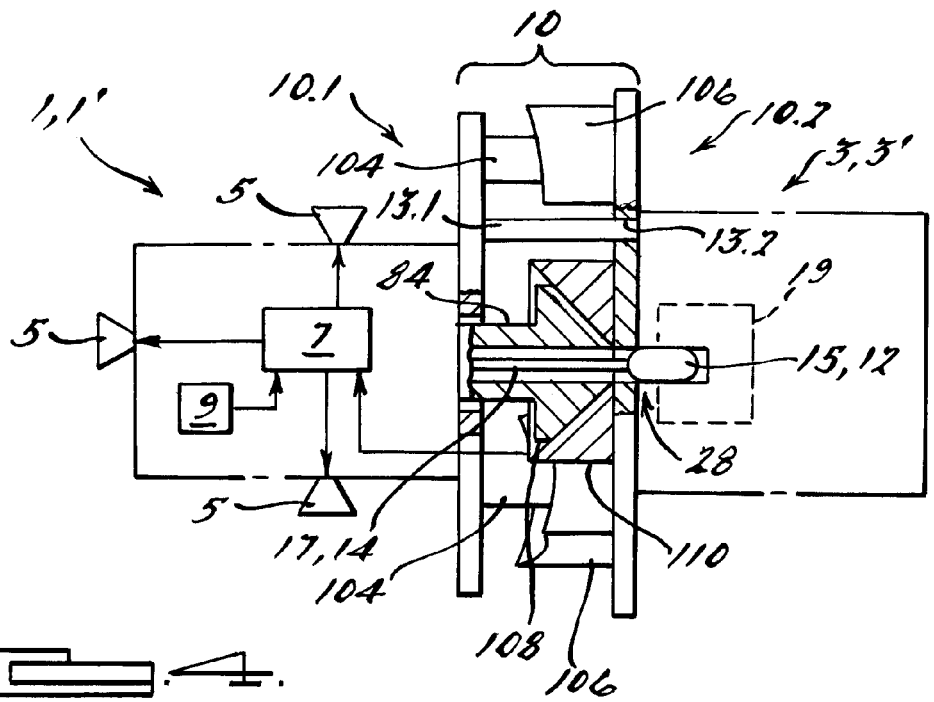
FIG. 4 illustrates the result of a rigidization process.

Referring to FIG. 4, following the hard-docking process, a rigidization process is then commenced by retracting the main docking boom 84 into the chase vehicle 1, while continuing to maintain tension in the extendable tension element 17, which brings the chase 1 and target 3 vehicles further together until a plurality of auto-alignment guideposts 104 distal to the main docking boom 84 of the chaser portion 10.1 of the docking system 10 engage a corresponding plurality of secondary target receptacles 106 distal to the primary target receptacle 28 of the target portion 10.2 of the docking system 10. Simultaneously, the transfer devices or conduits 13.1, 13.2 of the chase 1 and target 3 vehicles, if present, also engage or align with one another so as to provide for transfer of material, fluid, electrical power or information therebetween. The tension in the extendable tension element 17 holds the auto-alignment guideposts 104 against the corresponding secondary target receptacles 106, which, being distal relative to the first 11.1 and second 11.2 roll axes, provides for rigidizing the coupling between the chase 1 and target 3 vehicles. For example, in one set of embodiments, there are a plurality of three auto-alignment guideposts 104 and corresponding secondary target receptacles 106 arranged in a triangular pattern around and proximate to the periphery of the first 10.1 and second 10.2 portions of the docking system 10, which provides for three sets of contact surfaces where the first 10.1 and second 10.2 portions of the docking system 10 abut one another, wherein upon rigidization, the contact surfaces are adapted to prevent relative translation and rotation of the first 10.1 and second 10.2 portions of the docking system 10 relative to one another, thereby further stabilizing the coupling of the chase 1 and target 3 vehicles.

The process of undocking the chase 1 and target 3 vehicles commences by extending the main docking boom 84 so as to disengage the auto-alignment guideposts 104 and corresponding secondary target receptacles 106, thereby relieving the rigidization forces acting therebetween, then releasing the tension in the extendable tension element 17, followed by releasing the coupling element 15 from its coupling with the primary target receptacle 28 so as to decouple the chase 1 and target 3 vehicles, retracting the extendable tension element 17 so as to extract the coupling element 15 from the primary target receptacle 28, and finally retracting the main docking boom 84 so as to leave the target vehicle 3, if in a substantially zero gravity field, substantially unperturbed relative to its position prior to undocking.

Although the auto-alignment guideposts 104 have been illustrated in association with the chaser portion 10.1 of the docking system 10, and the corresponding secondary target receptacles 106 have been illustrated in association with the target portion 10.2 of the docking system 10, it should be understood that the auto-alignment guideposts 104 could also be associated with the target portion 10.2 of the docking system 10, or some of the auto-alignment guideposts 104 could be associated with, e.g. located on, the chaser portion 10.1 of the docking system 10, and the remaining auto-alignment guideposts 104 could be associated with, e.g. located on, the target portion 10.2 of the docking system 10, wherein for a particular auto-alignment guidepost 104 associated with, e.g. located on, one of the chaser 10.1 and target 10.2 portions of the docking system 10, the corresponding secondary target receptacle 106 would be associated with, e.g. located on, the other of the target 10.2 and chaser 10.1 portions of the docking system 10.

Figure 10:
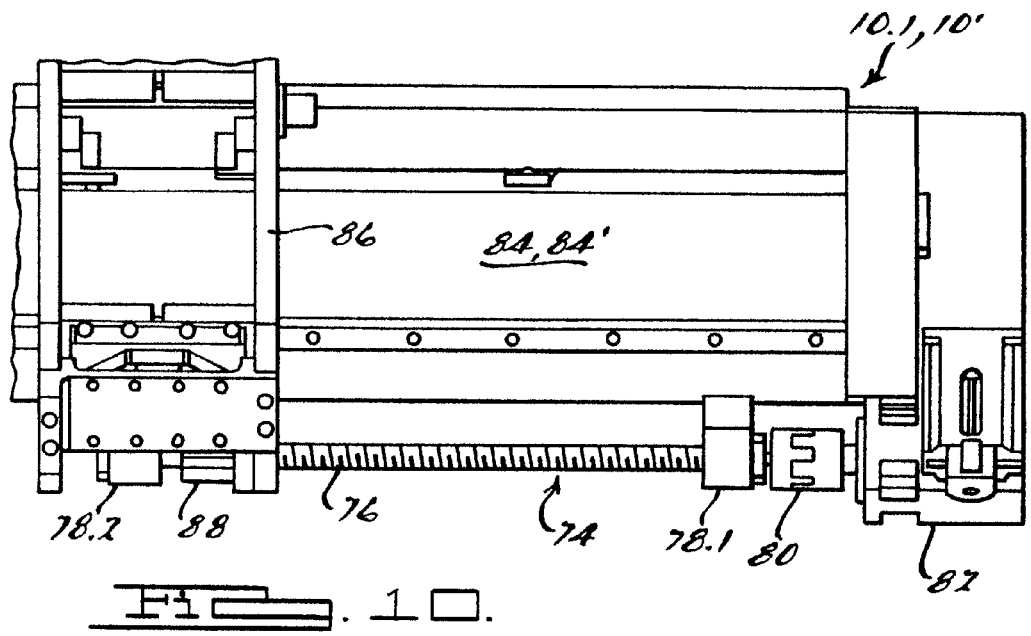
FIG. 10 illustrates a main docking boom in cooperation with an associated ballscrew-driven boom drive actuator.
Figure 11:
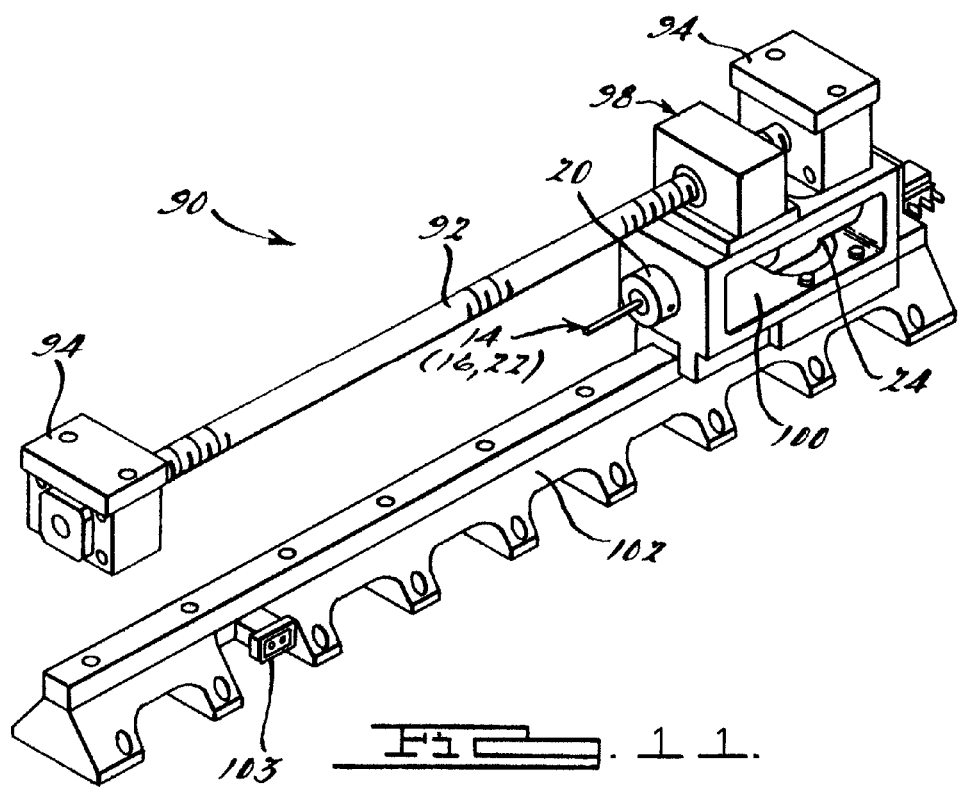
FIG. 11 illustrates a ballscrew-driven cable actuator.

In accordance with a first aspect of a docking system 10', the cooperation of the coupling element 15 with the primary target receptacle 28 is adapted so as to be completely controllable from the chase vehicle 1, so as to provide for docking the chase vehicle 1 with a passive target vehicle 3. For example, referring to FIGS. 5-14, an autonomous satellite docking system 10' (ASDS 10') comprises what is known as a Harpoon end effector 12, which is attached to an extendable tension element 17 comprising a docking cable 14 that is extended from the chaser portion 10.1 of the docking system 10. This docking cable 14 comprises a series of flexible load-bearing wire ropes or cables 16 that are fixed at one end to a Harpoon base part 18, for example, as illustrated in FIGS. 5-9, and at the other end to an attachment platform 20 of the chaser portion 10.1 of the docking system 10, for example, as illustrated in FIG. 11. The load-bearing wire ropes or cables 16 surround a control cable 22, the latter of which, when pulled back by a retraction mechanism 24 located inside the chaser portion 10.1 of the docking system 10, disengages and resets a Harpoon mechanism 12' of the Harpoon end effector 12. For example, the retraction mechanism 24 may comprise either a linear actuator, e.g. a solenoid, motor driven ball screw or rack and pinion mechanism, or a hydraulic actuator; or a motor driven spool drive mechanism. A sheath 26 comprising a relatively tightly wound extension spring 26' surrounds the docking cable 14, and both protects the inner cable components 16, 22 from abrasion or contamination and adds sufficient stiffness to the docking cable 14 to enable the docking cable 14 and sheath 26 to provide for inserting the Harpoon end effector 12 into the primary target receptacle 28 of the target vehicle 3.

Referring to FIGS. 5-8, an outer shell 30 of the Harpoon end effector 12 contains all of the moving parts of the Harpoon mechanism 12', and is a primary structural component thereof. A plurality of outer ball bearings 32 are captured within tapered holes 34 extending through the outer shell 30, wherein the tapers of the tapered holes 34 are adapted so that the outboard portion thereof is smaller than the diameter of the outer ball bearings 32, yet sufficiently large so as to enable the outer ball bearings 32 to extend beyond the outer surface of the outer shell 30 without falling out of the Harpoon mechanism 12' when the Harpoon mechanism 12' is deployed. For example, in one embodiment, the outer shell 30 comprises a set of twelve tapered holes 34 substantially equi-spaced around the circumference of the outer shell 30, which hold a corresponding set of twelve outer ball bearings 32. A forward portion 36 of the outer shell 30 is internally threaded so as to receive a mating externally threaded inner shell 38, both of which are rounded 40 so as to provide for smooth insertion into the primary target receptacle 28 of the target vehicle 3 during docking, without snagging the primary target receptacle 28. When threaded into the outer shell 30, the inner shell 38 of the Harpoon end effector 12 provides for containing all of the interior components (32, 56, 60, 62) thereof.

Figure 5:
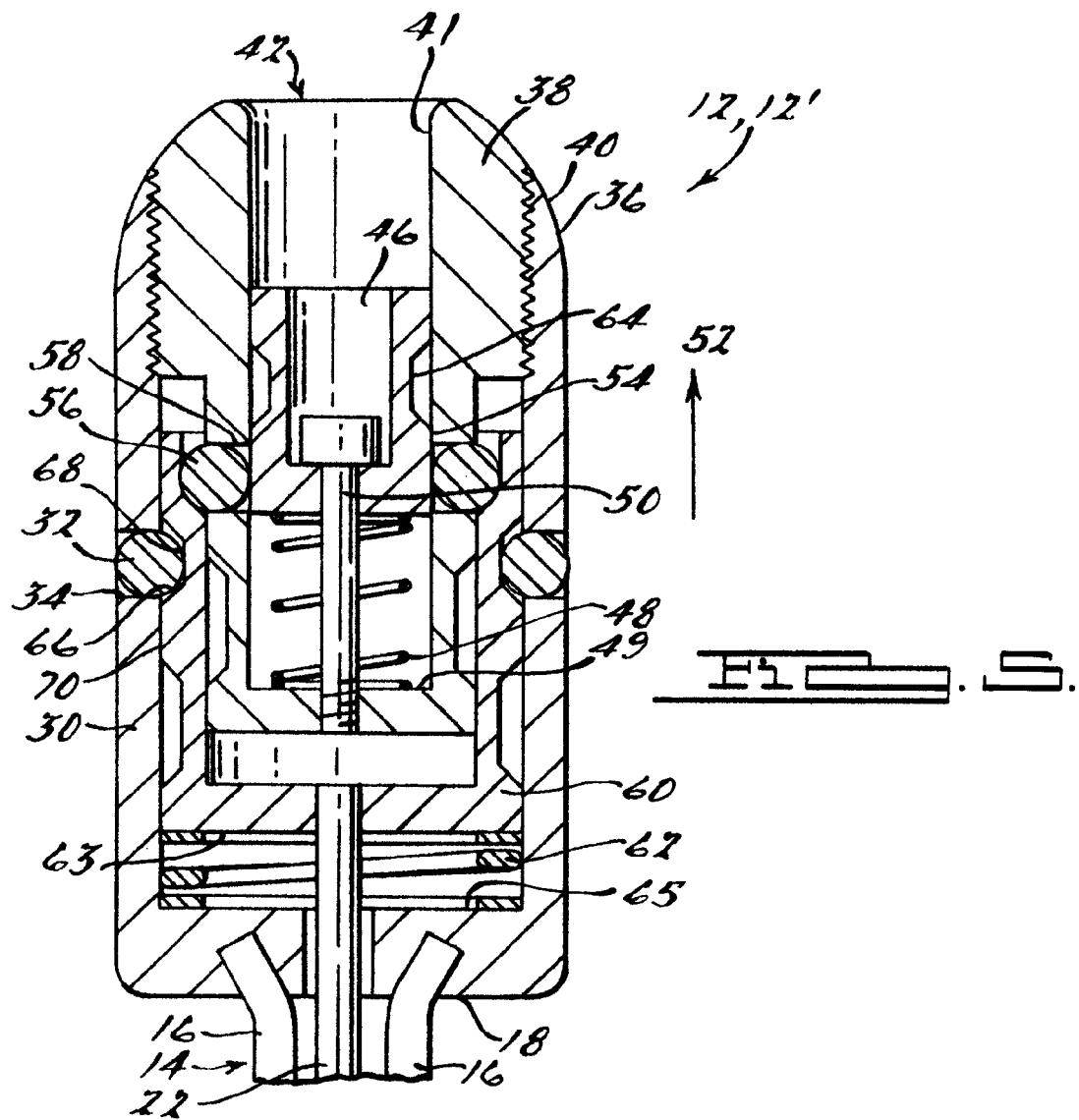
FIG. 5 illustrates a Harpoon end effector in an armed state.

Referring also to FIG. 8, the inner shell 38 comprises a bore 41 which is adapted to receive a triggering pin 44 associated with the primary target receptacle 28. The triggering pin 44 slides therein through a forward aperture 42 of the bore 41 during the soft-docking process as the Harpoon end effector 12 is inserted in the primary target receptacle 28 of the target vehicle 3, and depresses a trigger plunger 46 that is also adapted to slide within the bore 41. The trigger plunger 46 is biased forward 52 within the bore 41 by a trigger spring 48 acting between the trigger plunger 46 and a base 49 of the inner shell 38. The trigger plunger 46 is retained by a trigger retaining screw 50 that is threaded into the base 49 of the inner shell 38, and that can be adjusted for depth. Referring to FIG. 5, the trigger plunger 46 is shown with the Harpoon mechanism 12' in an armed state, biased forward 52 against the trigger retaining screw 50 by the trigger spring 48, wherein, in this position, the outer cylindrical surface 54 of the trigger plunger 46 holds a set of inner ball bearings 56 outward in a corresponding set of holes 58 in the inner shell 38.

An actuator sleeve 60, located between the inside of the outer shell 30 and the outside of the inner shell 38, is adapted to slide within the outer shell 30 and over the inner shell 38. The actuator sleeve 60 is biased forward 52 by an actuator spring 62 acting between a base 63 of the actuator sleeve 60 and a base 65 of the outer shell 30. However, with the trigger plunger 46 in an armed state, the inner ball bearings 56 limit the forward 52 travel of the actuator sleeve 60 within the Harpoon mechanism 12'.

Referring to FIG. 6, when the trigger plunger 46 is depressed rearwards by the triggering pin 44, an outer groove 64 on the trigger plunger 46 aligns with the holes 58 in the inner shell 38 so as provide for receiving the inner ball bearings 56, which thereby being allowed to move radially inward toward the trigger plunger 46, clear the way for the actuator sleeve 60 to be pushed forward 52 by the actuator spring 62, thereby causing a ramped surface 66 of an outer groove 68 on the actuator sleeve 60 to force the outer ball bearings 32 outward in the tapered holes 34 until an outer cylindrical surface 70 of the actuator sleeve 60 locks the outer ball bearings 32 in place, thereby latching the Harpoon mechanism 12' in a deployed state as illustrated in FIG. 7.

The Harpoon mechanism 12' is normally kept in the armed state. The outer ball bearings 32 are allowed to move freely in and out of their deployed position, while the inner ball bearings 56 are held outwards by the trigger plunger 46 so as to prevent the actuator sleeve 60 from sliding forward 52 in its travel space. Referring to FIG. 8, upon commencement of the soft-docking process, the Harpoon end effector 12 enters the primary target receptacle 28 of the target vehicle 3 and slides through a capture ring 72 therein. The triggering pin 44 of the target vehicle 3 engages with the bore 41 of the Harpoon end effector 12 and depresses the trigger plunger 46 against the trigger spring 48 sufficient to allow the inner ball bearings 56 to move into the outer groove 64 on the trigger plunger 46, thereby moving the inner ball bearings 56 out of the way of the actuator sleeve 60, which is then pushed forward 52 in its travel space by the actuator spring 62. The outer ball bearings 32 are then forced outward by the ramped surface 66 on the outside of the actuator sleeve 60, and then locked in place once the outer cylindrical surface 70 adjacent the ramped surface 66 engages the outer ball bearings 32, thereby placing the Harpoon mechanism 12' in a deployed state. The capture ring 72 is adapted so that an armed Harpoon end effector 12 can slide therethrough, but a deployed Harpoon end effector 12 cannot. Upon deployment, the outer ball bearings 32 are located forward of the capture ring 72 within the primary target receptacle 28, so that the Harpoon end effector 12 is thereby captured by the capture ring 72, so that the outer ball bearings 32 retain the Harpoon end effector 12 in the primary target receptacle 28 of the target vehicle 3 once the Harpoon mechanism 12' is deployed therein.

Referring to FIG. 9, in accordance with another embodiment, the docking cable 14 extendable tension element 17 comprises a docking cable assembly 14' comprising first 73 and second 75 cable assembly terminals which are respectively coupled to opposite ends of a plurality load-bearing wire ropes or cables 16. For each load-bearing wire rope or cable 16, a first end 16.1 thereof extends through a central portion of the first cable assembly terminal 73 at a first end 73.1 thereof, and is connected thereto within outwardly angled holes 77 therein at the second end 73.2 thereof, for example, by swaging, welding, brazing or soldering 79. The second end 16.2 of the load-bearing wire rope or cable 16 extends through a central portion of a first end 75.1 of the second cable assembly terminal 75, through a threaded adjustment bushing 81 threaded into an oblique land 83 on a side of the second cable assembly terminal 75, and a ferrule 85 that cooperates with the threaded adjustment bushing 81 is swaged on the end of the second end 16.2 of the load-bearing wire rope or cable 16. The docking cable assembly 14' further comprises a control cable 22 within an inner cable sheath 87, the latter of which, for example, comprises a tightly wound extension spring 87'. A first end 87.1 of the inner cable sheath 85 extends into the central portion of the first end 73.1 of the first cable assembly terminal 73. The control cable 22 extends through the first end 85.1 of the inner cable sheath 85, and through a bushing 89 in the central portion of the second end 73.2 of the first cable assembly terminal 73, and is terminated with a ferrule 91 that is swaged on a first end 22.1 of the control cable 22, wherein the ferrule 91 cooperates with the base 63 of the actuator sleeve 60 so as to provide for transferring a load thereto when the control cable 22 is tensioned. The plurality load-bearing wire ropes or cables 16 are distributed around the inner cable sheath 85 so as to provide for reducing unbalanced offset loading of the first 73 and second 75 cable assembly terminals when the docking cable assembly 14' is tensioned. It should be understood that the top half of the section illustrated in FIG. 9 illustrates a radial section through a portion of the docking cable assembly 14' containing one of the load-bearing wire ropes or cables 16, and the bottom half of the section illustrated in FIG. 9 illustrates a radial section through a portion of the docking cable assembly 14' between the load-bearing wire ropes or cables 16. The plurality load-bearing wire ropes or cables 16 are surrounded by the outer sheath 26, for example, comprising a relatively tightly wound extension spring 26' which both protects the inner cable components 16, 87, 22 from abrasion or contamination and adds sufficient stiffness to the docking cable 14 to enable the docking cable 14 and sheath 26 so as to provide for inserting the Harpoon end effector 12 into the primary target receptacle 28 of the target vehicle 3. The second end 73.2 of the first cable assembly terminal 73 is threaded 93 so as to provide for coupling with a mating internal thread in the base 65 of the outer shell 30, and the second end 75.2 of the second cable assembly terminal 75 is threaded 95 so as to provide for coupling to a mating internal thread in the attachment platform 20 of the chaser portion 10.1 of the docking system 10. The threaded adjustment bushings 81 are used to pretension the load-bearing wire ropes or cables 16 sufficient to seat the first 26.1 and second 26.2 ends of the outer sheath 26 in respective counterbores 97 in the respective first ends 73.1, 75.1 of the first 73 and second 75 cable assembly terminals, respectively, so as to make the docking cable assembly 14' sufficiently rigid in bending to provide for inserting the Harpoon end effector 12 into the primary target receptacle 28 of the target vehicle 3.

Figure 14:
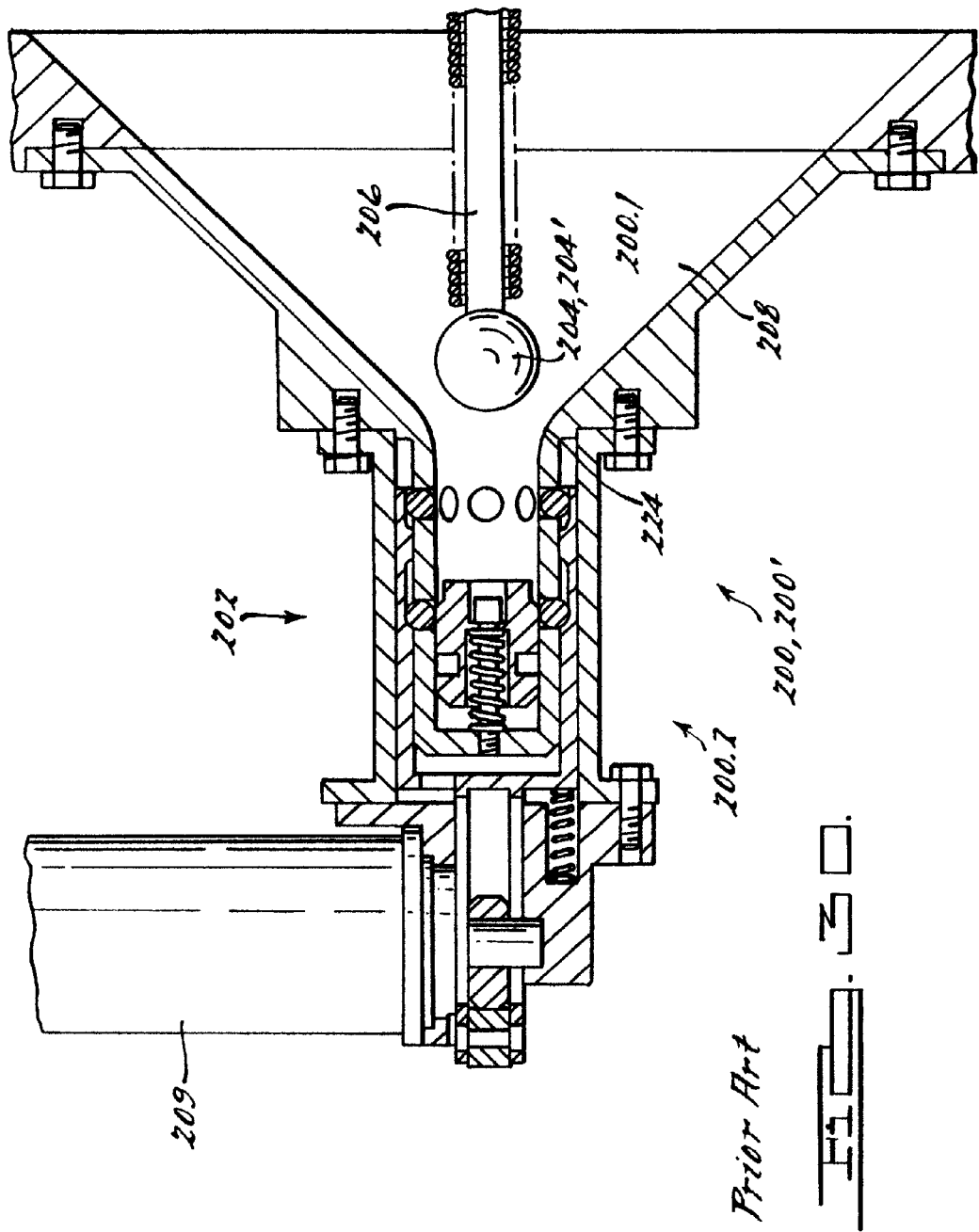
FIG. 14 illustrates a main docking boom in cooperation with associated guides and guide shuttles.

Prior to or during the hard-docking process, the main docking boom 84 is at least partially extended from the chaser portion 10.1 of the docking system 10 in preparation for the associated subsequent rigidization process. For example, the main docking boom 84 is at least partially extended prior to, or during, the soft-docking process. Referring to FIG. 10, the extension and retraction of the main docking boom 84 is provided by a ballscrew-driven boom drive actuator 74, comprising a ballscrew 76 supported by first 78.1 and second 78.2 ballscrew mounts, and driven through a spider coupling 80 by a motor and gearbox system 82 attached to the aft end of the main docking boom 84. The first ballscrew mount 78.1 is attached to the main docking boom 84, and the second ballscrew mount 78.2 is attached to a mounting structure 86 by which the chaser portion 10.1 of the docking system 10 is mounted to the chase vehicle 1. The ballscrew 76 drives a ballscrew nut 88 on the ballscrew 76 between the first 78.1 and second 78.2 ballscrew mounts. The ballscrew nut 88 is attached to the mounting structure 86. Referring to FIG. 14, the main docking boom 84 is supported from the mounting structure 86 by a plurality of linear ball-bearing guide shuttles 114 which cooperate with corresponding linear guides 116 on the main docking boom 84, so as to provide for rigidity of the system during testing, wherein space-rated ball-bearing glides 118 would be used in the linear ball-bearing guide shuttles 114 for space-based applications. In operation, the ballscrew 76 is rotated by the motor and gearbox system 82 through the spider coupling 80. The ballscrew 76 rotates freely within the first 78.1 and second 78.2 ballscrew mounts but reacts with the ballscrew nut 88 so as to cause the main docking boom 84 to translate relative to the mounting structure 86, thereby either extending or retracting the main docking boom 84 depending upon the direction of rotation of the ballscrew 76. The ballscrew-driven boom drive actuator 74 exhibits relatively low frictional losses and relatively substantial mechanical advantage, so that a relatively small motor and gearbox system 82 associated therewith can provide for sufficient extension and retraction forces for the associated docking processes.

Referring to FIG. 11, the docking cable 14 is actuated relative to the main docking boom 84 using a ballscrew-driven cable actuator 90 that can be placed almost entirely inside the main docking boom 84, and which is attached thereto and moves therewith. A single ballscrew 92 runs the length of the boom structure 84' and is supported therefrom by a plurality of ballscrew mounts 94'. Referring also to FIG. 12, the ballscrew 92 is driven by a geared motor 96 at the interior (aft) end of the main docking boom 84, and a ballscrew nut 98 on the ballscrew 92 between the ballscrew mounts 94' is operatively coupled to a cable shuttle 100. The docking cable 14 is attached to an attachment platform 20 operatively associated with the cable shuttle 100, the latter of which is mounted on a linear rail 102 inside the main docking boom 84, which prevents the cable shuttle 100 from turning with the ballscrew 92 but allows the cable shuttle 100 to move axially inside the main docking boom 84, the range of motion of which is limited by an end-of-travel microswitch 103. Accordingly, actuation of the ballscrew-driven cable actuator 90 rotates the ballscrew 92 which translates the ballscrew nut 98 and the cable shuttle 100 and docking cable 14 attached thereto, wherein a rotation of the ballscrew 92 in one direction provides for extending the docking cable 14 from the main docking boom 84 so as to provide for the initiation of soft-docking, and rotation of the ballscrew 92 in the other direction provides for retracting the docking cable 14 into the main docking boom 84 after the Harpoon end effector 12 is deployed upon commencement of the subsequent hard-docking process.

Referring to FIG. 12, the Harpoon end effector 12 and docking cable 14 are extended from a central opening 112 in the boom head 108 located on the forward 52 end of the main docking boom 84. The boom head 10 is shaped so as to mate with a corresponding primary target cone 110 on the target portion 10.2 of the docking system 10, wherein during the hard-docking process, the boom head 10 becomes mated with the primary target cone 110, resulting in a rough axial alignment of the chase 1 and target 3 vehicles, and preventing large-angle pitch and yaw skewing therebetween. The primary target cone 110 serves as a centrally located capture target for the initial contact with the Harpoon end effector 12 mounted on the docking cable 14, and can be made as wide or as narrow as necessary to capture the Harpoon end effector 12 as the Harpoon end effector 12 is extended by the docking cable 14 outward from the chase vehicle 1.

Referring to FIGS. 12-14, the chaser portion 10.1 of the docking system 10 is provided with a trio of auto-alignment guideposts 104, attached to the mounting structure 86, that are adapted to slide into matching secondary target receptacles 106 on the target portion 10.2 of the docking system 10, so as to provide for auto-alignment thereof during the association rigidization process following the hard-docking process. The secondary target receptacles 106 are surrounded by auto-alignment guide ramps 113 that slope towards associated pockets 115 adapted to receive and align the auto-alignment guideposts 104. For example, in one embodiment, each auto-alignment guide ramp 113 comprises a conical surface that leads into the associated secondary target receptacle 106, thereby providing the docking interface with a greater degree of compliance to roll misalignment after the primary target cone 110 and the boom head 108 have engaged with one another during hard-dock—with the chase 1 and target 3 vehicles then in substantial axial alignment, but not necessarily in roll alignment. The width of the auto-alignment guide ramps 113 is not limiting, other than by the angular span and associated circumferential distance between adjacent auto-alignment guide ramps 113. For example, for three equi-angularly spaced auto-alignment guide ramps 113, the width of each auto-alignment guide ramp 113 would be limited to 120 degrees, which would provide for compensating up to 60 degrees of roll misalignment in either direction, wherein, at the maximum width of the auto-alignment guide ramps 113, adjacent auto-alignment guide ramps 113 would circumferentially abut one another.

The sensors and guidance, navigation and control (GN&C) algorithm used in the autonomous guidance, navigation and control system 9 is adapted to provide for aligning the chaser 10.1 and target 10.2 portions of the docking system 10 sufficiently close that the upon commencement of the rigidization process, the auto-alignment guideposts 104 of the chaser portion 10.1 of the docking system 10 will be sufficiently aligned with their corresponding secondary target receptacles 106 of the target portion 10.2 of the docking system 10, so that if not perfectly aligned, the auto-alignment guideposts 104 will at least engage the associated auto-alignment guide ramps 113 of the corresponding secondary target receptacles 106, which then act to more precisely align the chaser 10.1 and target 10.2 portions of the docking system 10 upon rigidization by retraction of the main docking boom 84 into the chaser portion 10.1 of the docking system 10.

The docking process is commenced with the Harpoon end effector 12 in an armed state, either as a result of a previous un-docking operation, or by retraction of the control cable 22 by the associated retraction mechanism 24 operatively coupled to the cable shuttle 100. The chase vehicle 1 is maneuvered into alignment with the target vehicle 3 by thrusters 5 under control of the autonomous guidance, navigation and control system 9. Upon alignment of the chase 1 and target 3 vehicles that is sufficiently close to commence docking thereof, the docking cable 14 is then extracted from the central opening 112 in the boom head 108 of the main docking boom 84 using the ballscrew-driven cable actuator 90, until the Harpoon end effector 12 enters the primary target receptacle 28 and capture ring 72 of the target portion 10.2 of the docking system 10, possibly being guided thereinto the associated primary target cone 110, whereafter the triggering pin 44 of the chaser portion 10.2 enters the forward aperture 42 and bore 41 of the inner shell 38 of the Harpoon end effector 12, thereafter depressing the trigger plunger 46, which causes the Harpoon mechanism 12' to deploy, thereby extending the outer ball bearings 32 thereof through the associated tapered holes 34 in the outer shell 30, which causes the Harpoon end effector 12 becomes captured in the primary target receptacle 28 by the capture ring 72, thereby effecting a soft-dock of the chase 1 and target 3 vehicles. The docking cable 14 is then retracted by the ballscrew-driven cable actuator 90 acting on the cable shuttle 100. The main docking boom 84 is extended by the associated ballscrew-driven boom drive actuator 74, either in combination with or separate from the process of retracting the docking cable 14. Upon sufficient retraction of the docking cable 14, the boom head 108 becomes engaged with the primary target cone 110, thereby effecting a hard-dock of the chase 1 and target 3 vehicles. Thereafter, the main docking boom 84 is retracted by the associated ballscrew-driven boom drive actuator 74, thereby drawing the chase 1 and target 3 vehicles further together until the auto-alignment guideposts 104 of the chase portion 10.1 of the docking system 10 engage with the corresponding secondary target receptacles 106 of the target portion 10.2 of the docking system 10, thereby rigidizing the docking of the chase 1 and target 3 vehicles.

Following docking, the chase 1 and target 3 vehicles are undocked by first extending the main docking boom 84 using the associated ballscrew-driven boom drive actuator 74, thereby relieving rigidization forces between the auto-alignment guideposts 104 and the corresponding secondary target receptacles 106, followed by a separation of the chase 1 and target 3 vehicles with the boom head 108 still in hard-dock with the primary target receptacle 28. Then the docking cable 14 is extended by the ballscrew-driven cable actuator 90 sufficient to relieve tension therein, whereafter the control cable 22 is tensioned by the associated retraction mechanism 24, causing the control cable 22 to pull the actuator sleeve 60 of the Harpoon mechanism 12' back in its travel space, which then resets the Harpoon mechanism 12', allowing the outer ball bearings 32 to slide radially inward, thereby enabling the Harpoon end effector 12 to be released from the primary target receptacle 28 of the target vehicle 3, which occurs by retracting the docking cable 14 into the main docking boom 84 using the ballscrew-driven cable actuator 90. Upon release of the Harpoon end effector 12 from the primary target receptacle 28, the trigger plunger 46 is pulled away from contact with the triggering pin 44, which allows the trigger plunger 46 to snap forward 52, pushing the inner ball bearings 56 outward again so as to engage with and retain the actuator sleeve 60 with the actuator spring 62 compressed, thereby re-arming the Harpoon mechanism 12'.

Accordingly, the Harpoon end effector 12 provides for complete control of the docking and undocking processes from the chase vehicle 1, thereby enabling the chase vehicle 1 to dock with and to undock from a completely passive target vehicle 3, wherein the actions of capturing and releasing the target vehicle 3 during the associated docking and undocking processes occur relatively softly so as to not substantially perturb the trajectories of either the chase 1 or target 3 vehicles during these processes.

Figure 15A:
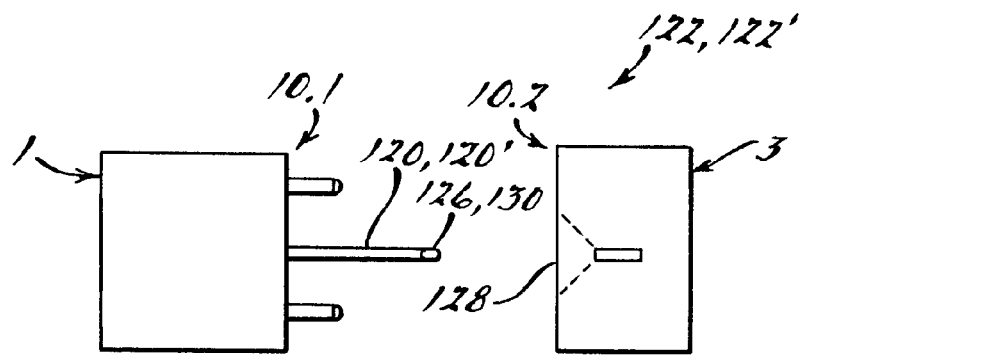
FIGS. 15a-c respectively illustrate rigid, semi-rigid and jointed posts used in cooperation with alternative docking systems.
Figure 15B:
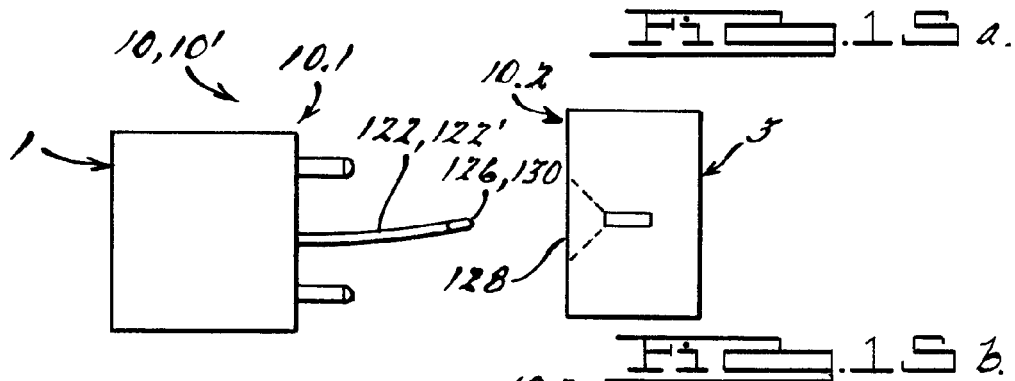
Figure 15C:
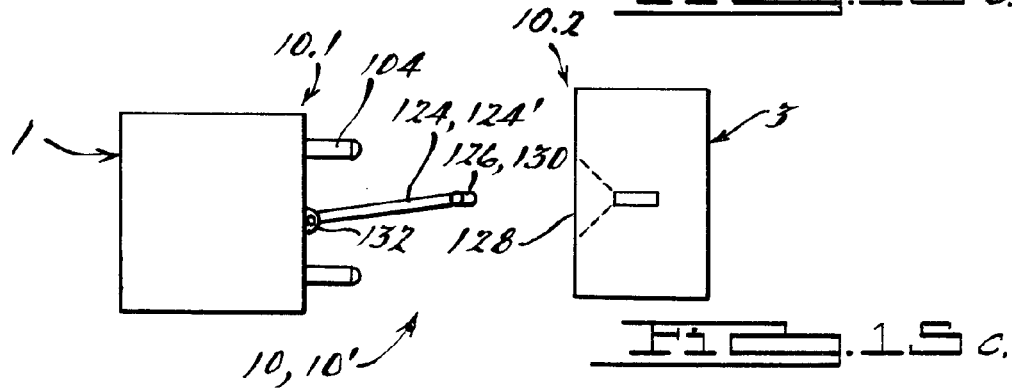

Referring to FIGS. 15a-c, in alternative embodiments, the docking cable 14 may be replaced with a rigid 120, semi-rigid 122 or jointed 124 post that is used to bring a capture mechanism 126 into engagement with a corresponding primary target receptacle 28 or receiving structure 128. Referring to FIG. 15a, in one embodiment, a latching device 130, such as the Harpoon mechanism 12' described above, is operatively coupled to an end of a rigid post 120, i.e. a non-flexible member 120', that is moved toward the target vehicle 3, either by actuated motion or by movement of the chase vehicle 1, until it engages a primary target receptacle 28 of a target vehicle 3 and successfully creates a connection between the two. Referring to FIG. 15b, in another embodiment, a latching device 130, such as the Harpoon mechanism 12', is operatively coupled to an end of a semi-rigid post 122, for example, a slightly flexible, but stiff member 122', that is moved toward the target vehicle 3, either by actuated motion or by movement of the chase vehicle 1, until it engages a primary target receptacle 28 of a target vehicle 3 and successfully creates a connection between the two. Referring to FIG. 15c, in yet another embodiment, a latching device 130, such as the Harpoon mechanism 12', is operatively coupled to an end of a rigid member 124' that is allowed to move in compliance with transverse motion, for example, as provided by joints 132 placed at one or both ends of the rigid member 124' to allow it to align with the primary target receptacle 28 of the target vehicle 3, and which is moved toward the target vehicle 3, either by actuated motion or by movement of the chase vehicle 1, until it engages a primary target receptacle 28 of a target vehicle 3 and successfully creates a connection between the two.

Figure 16:
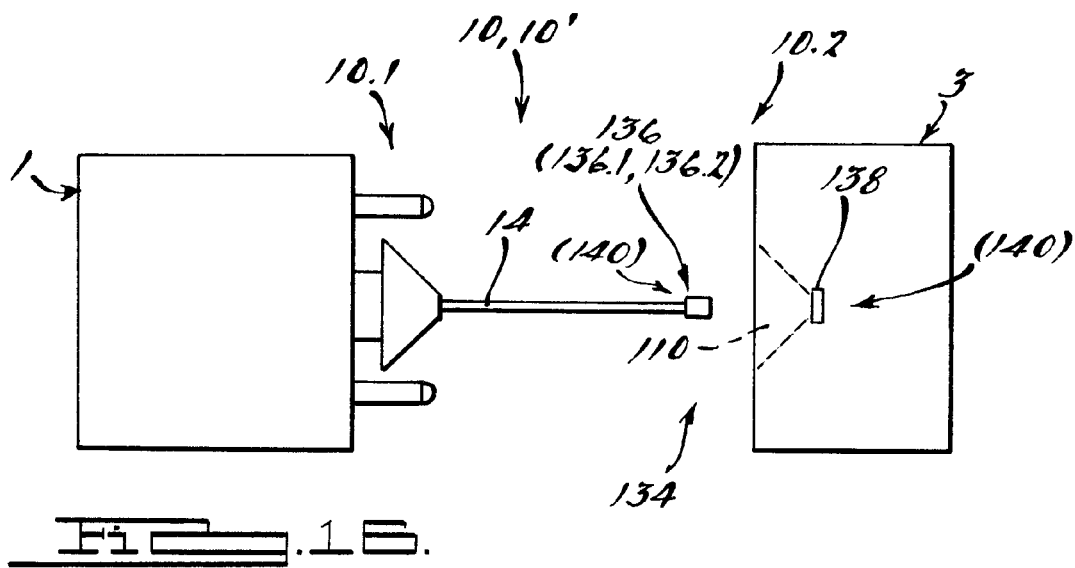
FIG. 16 illustrates an alternative docking system incorporating a magnetic end effector.
Figure 18:
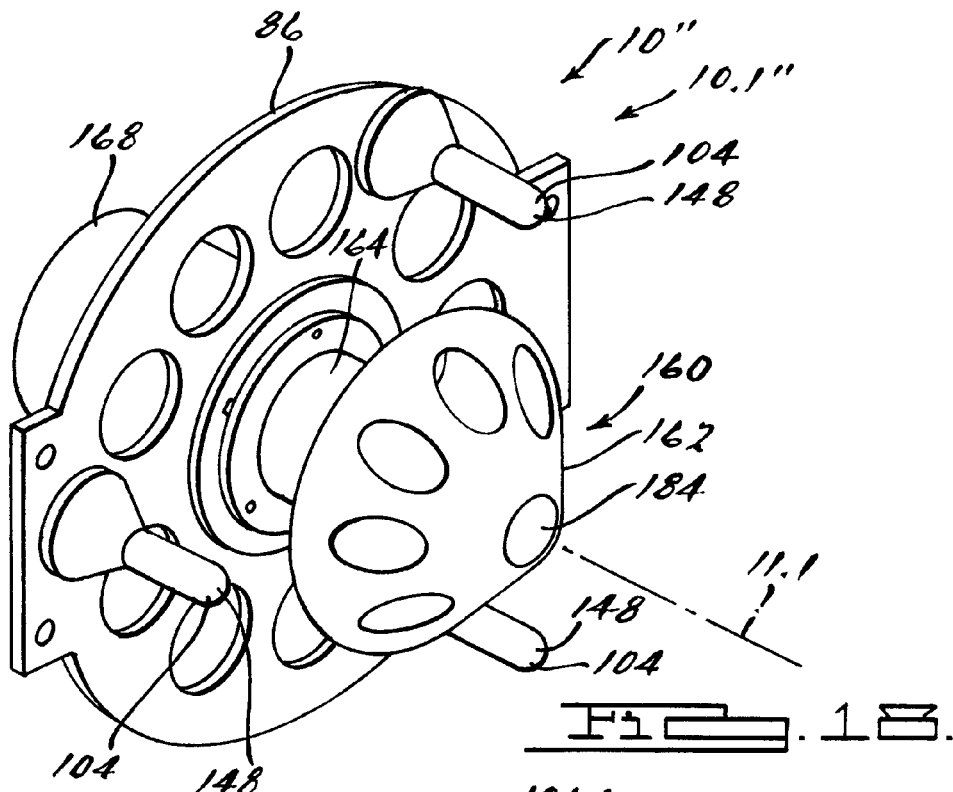
FIG. 18 illustrates a chaser portion of a second aspect an autonomous satellite docking system (ASDS)

Referring to FIG. 16, in yet another alternative embodiment, the Harpoon end effector 12 may be replaced with a magnetic latching device 134, which provides for a releasable coupling, but uses an attraction force between a magnetic end effector 136 and a strike plate 138 on the target vehicle 3, rather than a mechanical connection The magnetic end effector 136 can, for example, be either an electromagnet 136.1, which requires power to maintain the holding force, or a permanent magnet 136.2, which captures a target vehicle 3 without power. In the case of the permanent magnet magnetic end effector 136.2, an electromagnet 140 in either the target vehicle 3 or magnetic end effector 136 itself provides for nullifying the magnetic attraction in order to release the magnetic end effector 136, wherein power is not otherwise required except for this release operation.

Referring to FIGS. 8 and 17, in other alternative embodiments, the primary target cone 110 of the target vehicle 3 may be either a metallic cone 110.1; or a non-metallic cone 110.2, for example, constructed of fabric, plastic, or other flexible material, supported by a shape-retaining ring 142 at the opening thereof. A non-metallic cone 110.2 would provide for guiding the end effector (12, 136) of a given docking system 10 into a corresponding primary target receptacle 28 in the same manner as the metallic cone 110.1, but could provide for substantial reduction in mass and manufacturing complexity.

Referring to FIGS. 18-27, in accordance with a second aspect, the secondary target receptacles 106 of the target portion 10.2' of the docking system 10'' comprise first 106.1, second 106.2 and third 106.3 secondary target receptacles that are adapted to provide for a kinematic triad in cooperation with the associated auto-alignment guideposts 104 of the chaser portion 10.1'' of the docking system 10'', wherein a kinematic triad is defined as a collection of three sets of contact surfaces in a physical interface with one another that in combination eliminate exactly six degrees of freedom of movement at the interface thereof, without over-constraining that interface, so as to provide for a three-point kinematic rigidization system that provides for relatively precise and repeatable rotational and translational alignment of the chase 1 and target 3 vehicles at the docking interface.

A free rigid body in space has three degrees of freedom in translation (i.e. independent translations along the X, Y, and Z axes), and three degrees of freedom in rotation (i.e. independent rotations about X, Y, and Z axes). Accordingly, a kinematic triad between first and second rigid bodies would therefore prevent relative translation or rotation thereof, so the kinematically, the first and second rigid bodies would therefore act as a single rigid body. For example, one embodiment of a kinematic triad is provided by three spherical or hemispherical surfaces of the first body in respective cooperation with a conical alignment surface, a V-grooved alignment surface, and a planar alignment surface of the second body. A kinematic triad provides for repeatably and precisely aligning two bodies with respect to one another, in both rotation and translation, and for preventing the mating surfaces from binding with one another as a result of interference. For example, three spherical surfaces engaging with three conical surfaces would not provide for precise, repeatable alignment if the axes of revolution of the conical surfaces were not aligned with each of the respective centers of the associated spherical surfaces. As another example, three cylindrical plug surfaces might interfere and bind with three corresponding cylindrical plug holes if each of the plug surfaces were not aligned with each of the corresponding plug holes.

The auto-alignment guide ramps 113 provide for a relatively course rotational alignment of the chase 1 and target 3 vehicles by leading the auto-alignment guideposts 104 into the corresponding first 106.1, second 106.2 and third 106.3 secondary target receptacles located at the bottom of the auto-alignment guide ramps 113, which then cooperate with the auto-alignment guideposts 104 so as to provide for a relatively precise and repeatable rotational and translational alignment of the chase 1 and target 3 vehicles.

Figure 19:
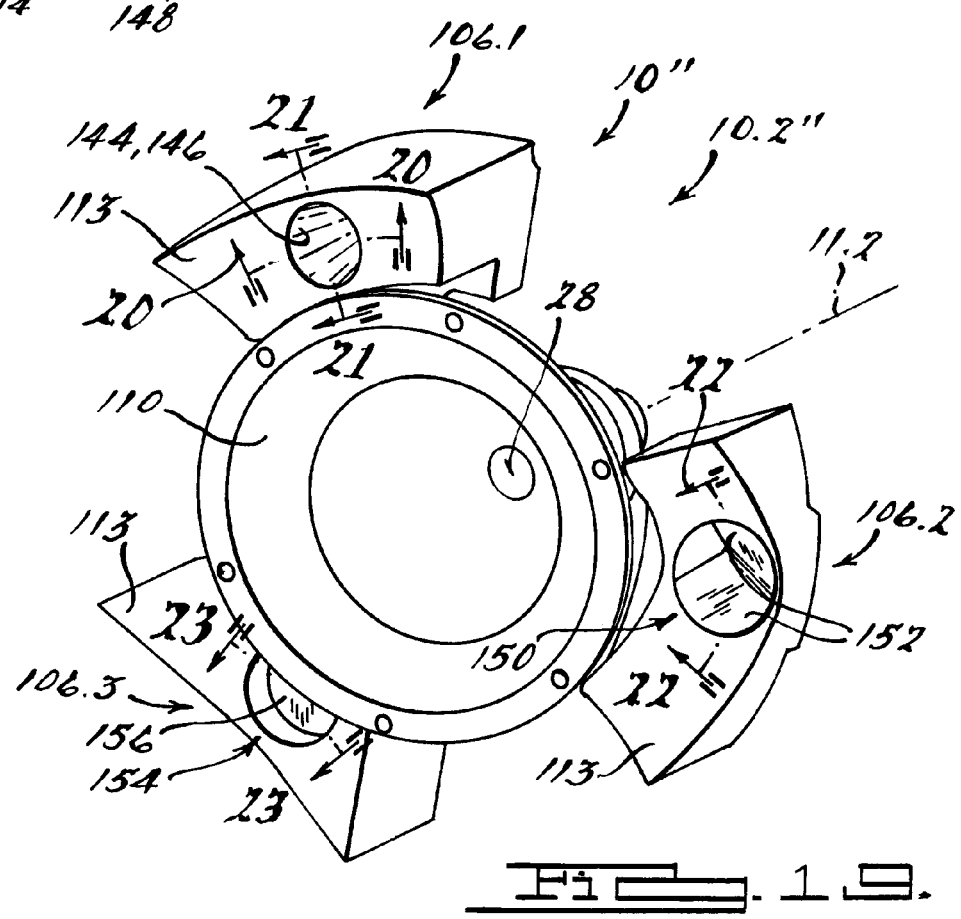
FIG. 19 illustrates a target portion of the second aspect an autonomous satellite docking system (ASDS)

Referring to FIGS. 19-21, the first secondary target receptacle 106.1 comprises a conical detent pocket 144 comprising a concave conical surface 146 (for example, in one embodiment, with a 45-degree slope relative to the second roll axis 11.2) that cooperates with a hemispherical surface 148 on the end of a corresponding auto-alignment guidepost 104 so as to provide for constraining the motion thereof in three degrees of freedom (DOF), wherein thee axis of revolution of the concave conical surface 146 is substantially parallel to the second roll axis 11.2. The auto-alignment guidepost 104, once bottomed against the concave conical surface 146 of the conical detent pocket 144, cannot move axially with respect to the concave conical surface 146, because it is constrained by the tension in the docking cable 14 pulling in one direction parallel to the second roll axis 11.2, and by the concave conical surface 146 in the opposite direction. Likewise, the auto-alignment guidepost 104 cannot move in either direction transverse to the second roll axis 11.2 because of the constraint thereof imposed by the concave conical surface 146.

Referring to FIGS. 19 and 22, the second secondary target receptacle 106.2 comprises a V-shaped groove pocket 150 comprising a pair of sloped planar surfaces 152, for example, in one embodiment, of the same depth and pitch angle as the concave conical surface 146 of the conical detent pocket 144 (for example, in one embodiment, the sloped planar surfaces 152 of the V-shaped groove pocket 150 each have a 45-degree pitch relative to the second roll axis 11.2), that cooperate with a hemispherical surface 148 on the end of a corresponding auto-alignment guidepost 104 so as to provide for constraining the motion thereof in two degrees of freedom (DOF). The auto-alignment guidepost 104, once bottomed against the sloped planar surfaces 152 of the V-shaped groove pocket 150, cannot move axially with respect to the sloped planar surfaces 152, because it is constrained by the tension in the docking cable 14 pulling in one direction parallel to the second roll axis 11.2, and by the sloped planar surfaces 152 in the opposite direction. The auto-alignment guidepost 104 cannot move in a direction transverse to both the second roll axis 11.2 and the sloped planar surfaces 152 because of the constraint thereof imposed by the sloped planar surfaces 152. However, the auto-alignment guidepost 104 is free to move in a direction transverse to the second roll axis 11.2 and parallel to the sloped planar surfaces 152, which allows the auto-alignment guidepost 104 to fully seat against the sloped planar surfaces 152 at a unique location, without interference, determined by the locations of the auto-alignment guideposts 104 and the corresponding first 106.1, second 106.2 and third 106.3 secondary target receptacles, and the cooperation thereof, when the auto-alignment guideposts 104 are seated against the corresponding first 106.1, second 106.2 and third 106.3 secondary target receptacles.

Referring to FIGS. 19 and 23, the third secondary target receptacle 106.3 comprises a flat-bottomed pocket 154 comprising a planar surface 156 that is substantially perpendicular to the second roll axis 11.2, and of a depth so that when the chase 1 and target 3 vehicles are rigidized, the associated first 11.1 and second 11.2 roll axes are substantially parallel to one another. The auto-alignment guidepost 104, once bottomed against the planar surface 156 of the flat-bottomed pocket 154, cannot move axially with respect to the planar surface 156, because it is constrained by the tension in the docking cable 14 pulling in one direction parallel to the second roll axis 11.2, and by the planar surface 156 in the opposite direction. Otherwise, the auto-alignment guidepost 104 is free to move in a direction transverse to the second roll axis 11.2 and parallel to the planar surface 156, which allows the auto-alignment guidepost 104 to fully seat against the planar surface 156 at a unique location, without interference, determined by the locations of the auto-alignment guideposts 104 and the corresponding first 106.1, second 106.2 and third 106.3 secondary target receptacles, and the cooperation thereof, when the auto-alignment guideposts 104 are seated against the corresponding first 106.1, second 106.2 and third 106.3 secondary target receptacles.

Accordingly, the auto-alignment guideposts 104 when fully seated against the corresponding first 106.1, second 106.2 and third 106.3 secondary target receptacles provide for eliminating a total of exactly six degrees of freedom (DOF) of relative motion between the chase 1 and target 3 vehicles, which thereby provides for a solid, well-defined load path and a repeatable, accurately aligned interface therebetween, without over-constraint.

Figure 28:
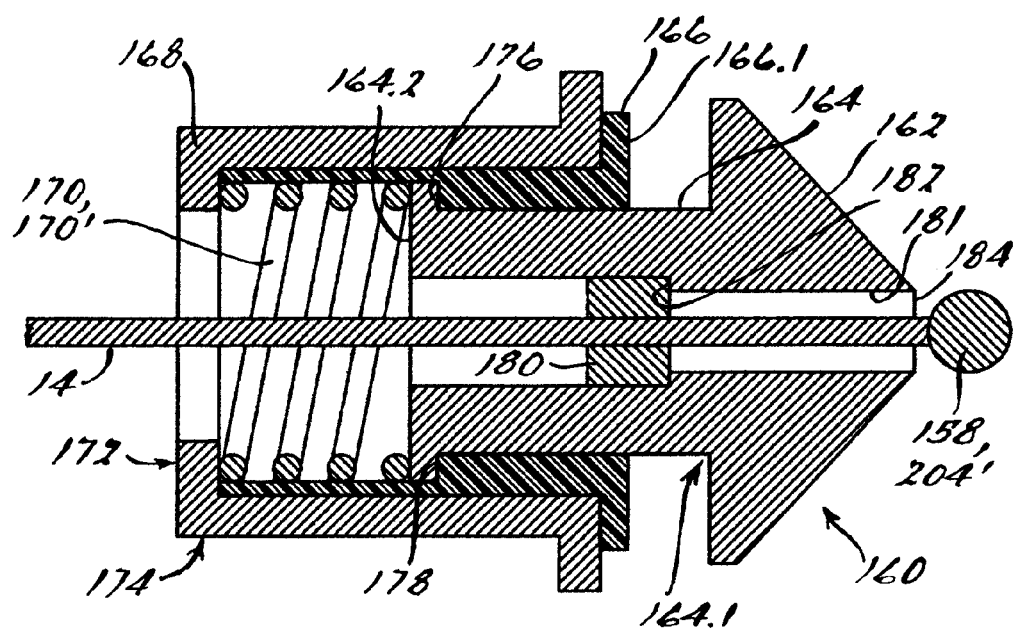
FIG. 28 illustrates a spring-loaded docking probe head in an unloaded condition.
Figure 29:
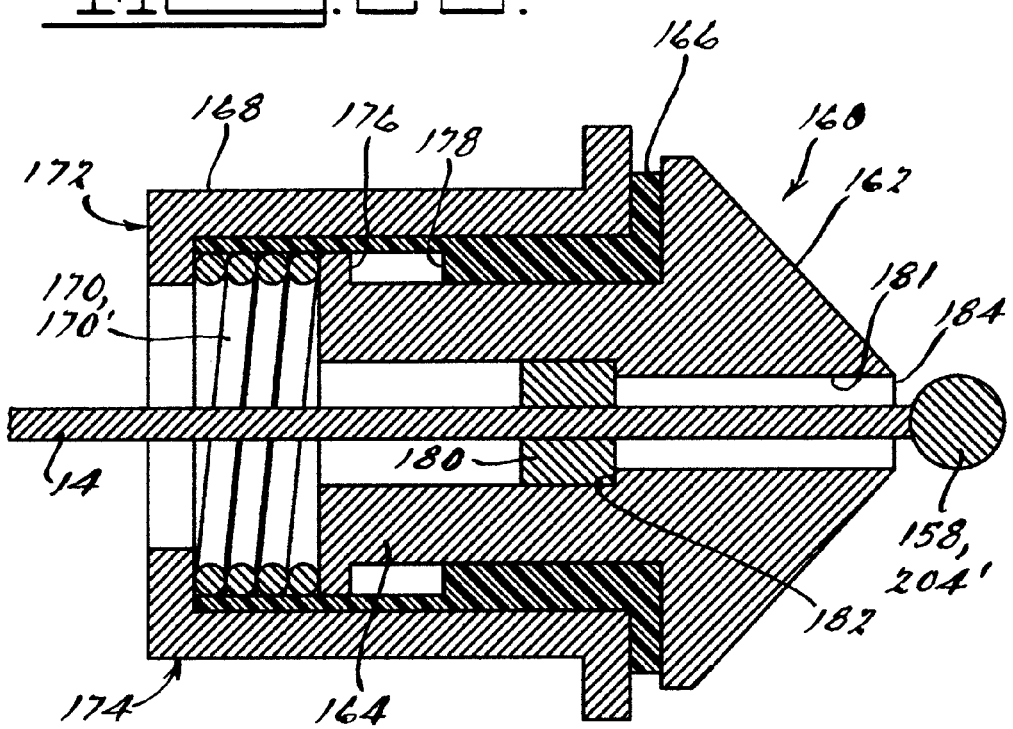
FIG. 29 illustrates a spring-loaded docking probe head in a loaded condition.

FIGS. 24-27 illustrate a docking sequence of the second aspect of the docking system 10", wherein, the associated chaser portion 10.1" is illustrated as incorporating a Harpoon end effector 12, although it should be understood that the second aspect of the docking system 10" is not so limited, but can be adapted to operate with other types of end effectors, for example, a spherical end effector 158, 204' as illustrated in FIGS. 28 and 29, as described more fully hereinbelow.

Referring to FIGS. 18, and 24-29, the chaser portion 10.1" incorporates a passive probe assembly 160 as an alternative to the active main docking boom 84 described hereinabove. More particularly a probe head 162, similar to the boom head 108, is adapted—for example, conically shaped—so as to provide for mating with the primary target cone 110. Referring to FIGS. 28 and 29, the probe head 162 extends from a first end 164.1 of a stub shaft 164 that is adapted to slide within a guide sleeve 166, for example, constructed of TEFLON®, pressed into a body sleeve 168, for example, constructed of aluminum, that is operatively coupled to the mounting structure 86 of the chaser portion 10.1" of the docking system 10". The stub shaft 164 and probe head 162 are outwardly biased by a spring 170, for example, a helical compression spring 170', located within the guide sleeve 166 and adapted to act between an internal flange 172 at the base 174 of the body sleeve 168, and a second end 164.2 of the stub shaft 164, wherein the second end 164.2 of the stub shaft 164 incorporates an external flange 176 that is adapted to engage with a first stop 178 incorporated acting towards the outboard end 166.1 of the guide sleeve 166, wherein the first stop 178 limits the outboard travel of the stub shaft 164 and probe head 162 responsive the outward bias of the spring 170, and provides for capturing the stub shaft 164 within the guide sleeve 166. The docking cable 14 extends through bores in the body sleeve 168, the guide sleeve 166, and the stub shaft 164 and probe head 162, wherein a cable ferrule 180 attached to the docking cable 14 is adapted to substantially center the docking cable 14 within a central bore 181 of the probe head 162. The outward extension of the docking cable 14 and probe head 162 from the chaser portion 10.1" of the docking system 10" is limited by the engagement of the external flange 176 of the stub shaft 164 with the first stop 178, and the engagement of the cable ferrule 180 with a second stop 182 within the stub shaft 164. Notwithstanding that FIGS. 28 and 29 illustrate a spherical end effector 158, 204' operatively coupled to the end of the docking cable 14, it should be understood that in another embodiment, as illustrated in FIGS. 24-26, a Harpoon end effector 12 can also be used in cooperation with the passive probe assembly 160, wherein the operation of the passive probe assembly 160 illustrated in FIGS. 28 and 29 is independent of the type of end effector used therewith.

Referring to FIG. 24, the docking process is commenced with the Harpoon end effector 12 in an armed state, either as a result of a previous un-docking operation, or by retraction of the control cable 22 by the associated retraction mechanism 24 operatively coupled to the cable shuttle 100. The chase vehicle 1 is maneuvered into alignment with the target vehicle 3 by thrusters 5 under control of the autonomous guidance, navigation and control system 9. Referring to FIGS. 24 and 25, upon alignment of the chase 1 and target 3 vehicles that is sufficiently close to commence docking thereof, the docking cable 14 is then extended from a central opening 184 of the central bore 181 in the probe head 162, for example, using a ballscrew-driven cable actuator 90 as described hereinabove in accordance with the embodiment incorporated a main docking boom 84. Referring to FIG. 28, as the docking cable 14 is extended, the spring 170 acting on the stub shaft 164 extends, thereby pushing the probe head 162 outwards from the chaser portion 10.1" of the docking system 10" until spring 170 is fully extended. After further extension of the docking cable 14, the cable ferrule 180 engages the second stop 182 in the stub shaft 164 and/or probe head 162, after which time further extension of the docking cable 14 causes the probe head 162 to further extend outwardly from the chaser portion 10.1" of the docking system 10", the motion of which would be limited by the engagement of the external flange 176 of the stub shaft 164 with the first stop 178 in the guide sleeve 166. However, typically, before that limit is reached, the Harpoon end effector 12 will have entered the primary target receptacle 28 and capture ring 72 of the target portion 10.2" of the docking system 10", possibly being guided thereinto the associated primary target cone 110, whereafter the triggering pin 44 of the chaser portion 10.2" enters the forward aperture 42 and bore 41 of the inner shell 38 of the Harpoon end effector 12, thereafter depressing the trigger plunger 46 which causes the Harpoon mechanism 12' to deploy, thereby extending the outer ball bearings 32 thereof through the associated tapered holes 34 in the outer shell 30, which causes the Harpoon end effector 12 becomes captured in the primary target receptacle 28 by the capture ring 72, thereby effecting a soft-dock of the chase 1 and target 3 vehicles, as illustrated in FIG. 25.

Referring to FIG. 26, the docking cable 14 is then retracted by the ballscrew-driven cable actuator 90, for example acting on a cable shuttle 100 as described hereinabove in accordance with the embodiment incorporated a main docking boom 84. Upon sufficient retraction of the docking cable 14, the probe head 162 becomes engaged with the primary target cone 110, and when the docking cable 14 is sufficiently retracted so that the base 174 of the stub shaft 164 compresses the spring 170, a hard-dock of the chase 1 and target 3 vehicles is effected, as illustrated in FIGS. 26 and 29, wherein most of the translational and rotational misalignments of the target vehicle 3 relative to the chase vehicle 1 have been resolved, with the possible exception of roll about the roll axis 11.1, 11.2. Thereafter, the docking cable 14 is further retracted by the ballscrew-driven cable actuator 90, thereby increasing the compression of the probe head 162 into the primary target cone 110 acting on the primary target cone 110, and drawing the chase 1 and target 3 vehicles further together until the auto-alignment guideposts 104 of the chase portion 10.1" of the docking system 10" engage with the target portion 10.2 of the docking system 10", possibly first with the corresponding auto-alignment guide ramps 113, and finally, with the corresponding first 106.1, second 106.2 and third 106.3 secondary target receptacles of the target portion 10.2" of the docking system 10", thereby rigidizing the docking of the chase 1 and target 3 vehicles to a relatively precise and repeatable rotational and translational alignment of the chase 1 and target 3 vehicles.

Upon rigidization, a first auto-alignment guidepost 104, once bottomed against a concave conical surface 146 of a conical detent pocket 144 of the first secondary target receptacle 106.1, cannot move axially with respect to the concave conical surface 146, because it is constrained by the tension in the docking cable 14 pulling in one direction parallel to the second roll axis 11.2, and by the concave conical surface 146 in the opposite direction. Likewise, the first auto-alignment guidepost 104 cannot move in either direction transverse to the second roll axis 11.2 because of the constraint thereof imposed by the concave conical surface 146.

Also upon rigidization, a second auto-alignment guidepost 104, once bottomed against a sloped planar surfaces 152 of a V-shaped groove pocket 150 of the second secondary target receptacle 106.2, cannot move axially with respect to the sloped planar surfaces 152, because it is constrained by the tension in the docking cable 14 pulling in one direction parallel to the second roll axis 11.2, and by the sloped planar surfaces 152 in the opposite direction. The second auto-alignment guidepost 104 cannot move in a direction transverse to both the second roll axis 11.2 and the sloped planar surfaces 152 because of the constraint thereof imposed by the sloped planar surfaces 152. However, the second auto-alignment guidepost 104 is free to move in a direction transverse to the second roll axis 11.2 and parallel to the sloped planar surfaces 152, which allows the auto-alignment guidepost 104 to fully seat against the sloped planar surfaces 152 at a unique location, without interference, determined by the locations of the auto-alignment guideposts 104 and the corresponding first 106.1, second 106.2 and third 106.3 secondary target receptacles, and the cooperation thereof, when the auto-alignment guideposts 104 are seated against the corresponding first 106.1, second 106.2 and third 106.3 secondary target receptacles.

Also upon rigidization, a third auto-alignment guidepost 104, once bottomed against a planar surface 156 of a flat-bottomed pocket 154 of the third secondary target receptacle 106.3, cannot move axially with respect to the planar surface 156, because it is constrained by the tension in the docking cable 14 pulling in one direction parallel to the second roll axis 11.2, and by the planar surface 156 in the opposite direction. Otherwise, the third auto-alignment guidepost 104 is free to move in a direction transverse to the second roll axis 11.2 and parallel to the planar surface 156, which allows the third auto-alignment guidepost 104 to fully seat against the planar surface 156 at a unique location, without interference, determined by the locations of the auto-alignment guideposts 104 and the corresponding first 106.1, second 106.2 and third 106.3 secondary target receptacles, and the cooperation thereof, when the auto-alignment guideposts 104 are seated against the corresponding first 106.1, second 106.2 and third 106.3 secondary target receptacles.

Accordingly, upon rigidization with the auto-alignment guideposts 104 fully seated in their corresponding first 106.1, second 106.2 and third 106.3 secondary target receptacles, the chase 1 and target 3 vehicles become aligned to a substantially unique and repeatable relative orientation with respect to all six degrees of freedom, wherein the are maintained in alignment by the action of the tension in the docking cable 14 reacted by the forces from the first 106.1, second 106.2 and third 106.3 secondary target receptacles acting on the corresponding associated auto-alignment guideposts 104.

Generally, the three-point kinematic rigidization system of the second aspect described hereinabove may be used with other types of end effectors and associated docking systems 10, besides the Harpoon mechanism 12' described above in accordance with the autonomous satellite docking system 10'

(ASDS 10'). For example, referring to FIGS. 30-34, in accordance with another embodiment of the second aspect, an autonomous rendezvous and docking system 200 of an autonomous rendezvous and docking system 200' (ARD system 200'), as described in U.S. Pat. No. 5,364,046, which is incorporated herein by reference, may be used instead of the Harpoon mechanism 12'.

Figure 30:
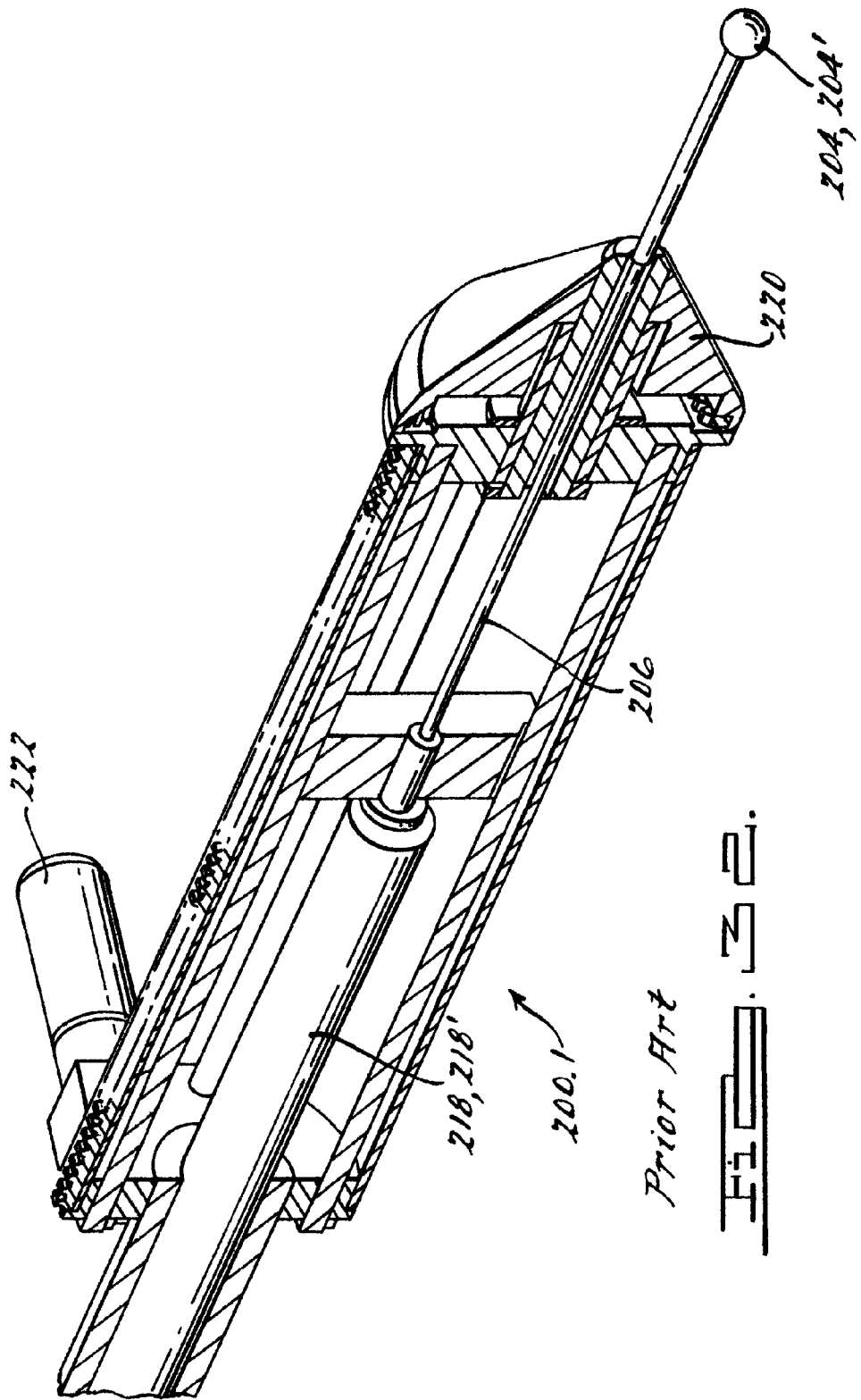
FIG. 30 illustrates a capture mechanism of a prior art docking system.

Referring to FIG. 30, the ARD system 200' utilizes an active latching receptacle 202 on the target portion 200.2 and a passive sphere 204—e.g. constructed of a rigid material, e.g. a metal such as brass—attached to a steel docking cable 206 on the chaser portion 200.1, wherein, a portion of a docking system is considered herein to be active if it requires a source of effort or power for the actuation thereof, regardless of from where that source of that effort or power is provided. As the docking cable 206 and sphere 204 are extended from the chase vehicle 1, they seat into the bottom of a primary target cone 208 on the target portion 200.2, which provides for capturing the sphere 204 with the latching receptacle 202. The sphere 204 is released from the latching receptacle 202 by a capture mechanism release motor 209. Accordingly, this design requires active components on both the chaser portion 200.1 (docking cable 206 and boom extension and retraction systems 212, 218, 222) and the target portion 200.2 (active latching and release systems 202, 209) of the docking system 200.

Figure 31:
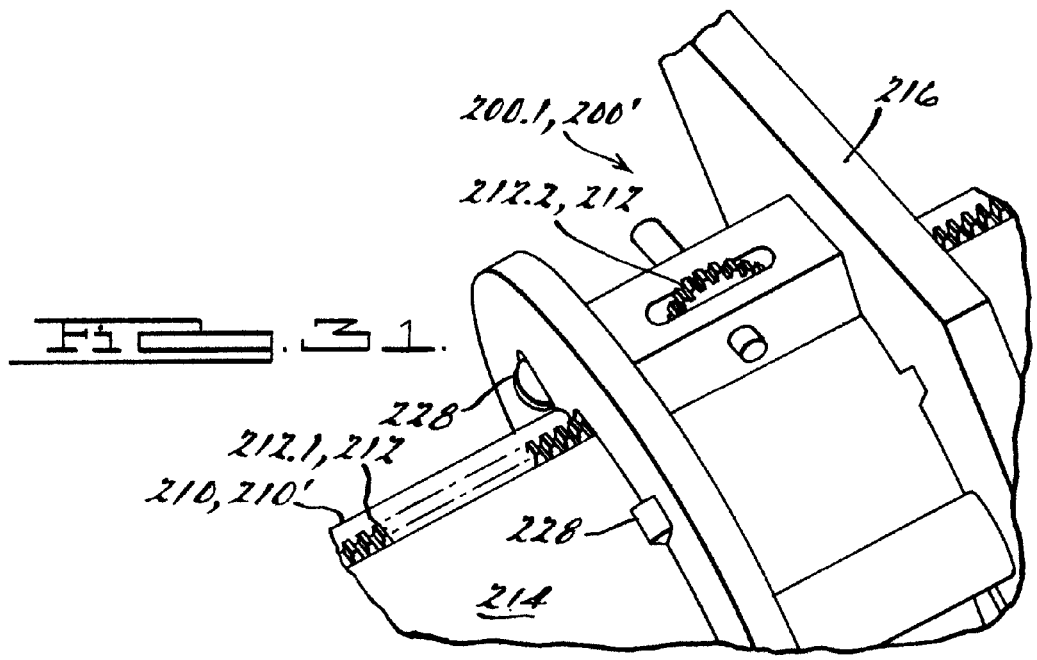
FIG. 31 illustrates an associated rack-and-pinion driven boom actuation system of the prior art docking system.

Referring to FIG. 31, the moving boom 210 of the ARD system 200' is driven by a rack-and-pinion gear system 212. The rack 212.1 is attached to the boom body tube 214 and runs the entire length of the boom 210. The pinion 212.2, driven by a geared-down motor (not illustrated), is held in contact with the rack 212.1 to drive the boom 210 in or out of the mounting structure 216. The main reason for this type of docking system 200 was that the ARD system 200' was designed to withstand a positive hard-docking impact and the geared motor system was intended to absorb this impact without damaging the structure or the spacecraft it was mounted on.

Referring to FIG. 32, the cable actuator 218 of the ARD system 200' comprises a standard linear actuator 218' attached to the interior (aft) end of the docking cable 206, and the end effector 204' of the ARD system 200' comprises the sphere 204 on the end of the docking cable 206.

Figure 33:
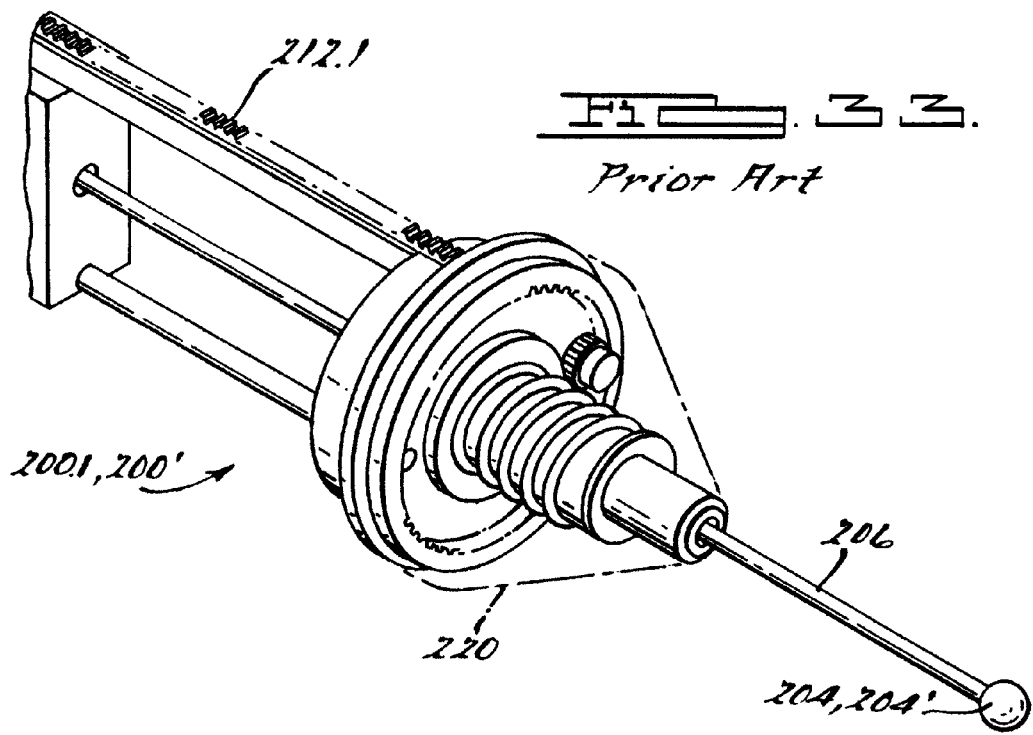
FIG. 33 illustrates an associated boom head rotation indexing system of the prior art docking system.
Figure 34:
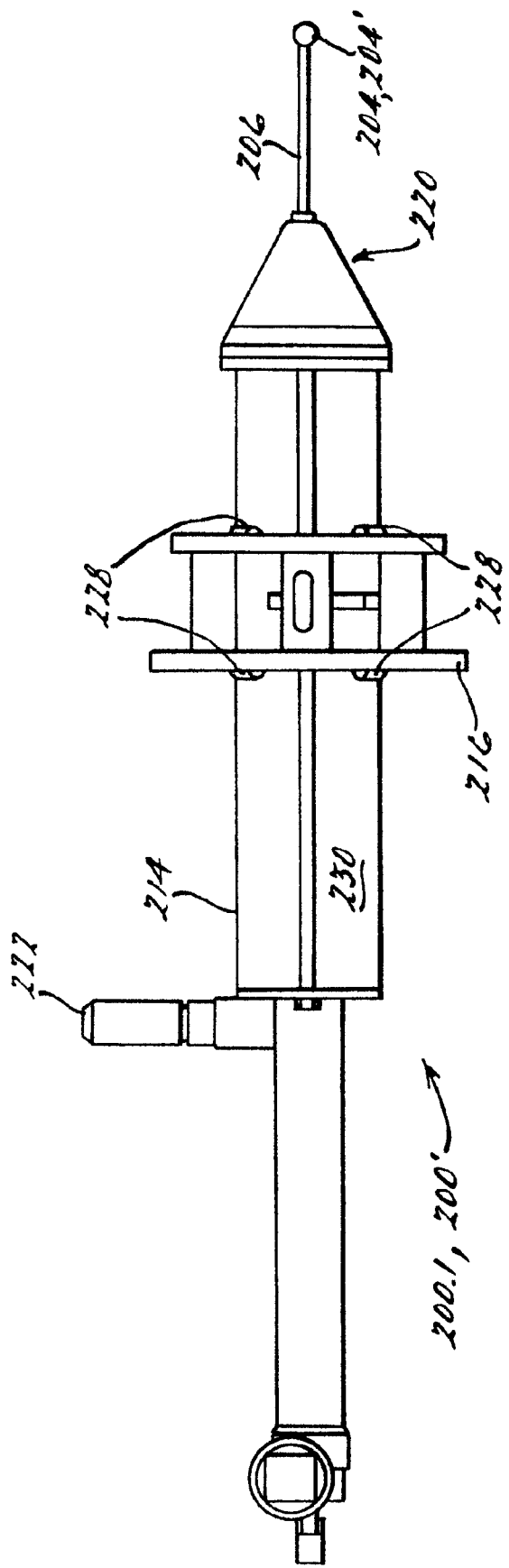
FIG. 34 illustrates associated boom glide components of the prior art docking system.
Figure 27:
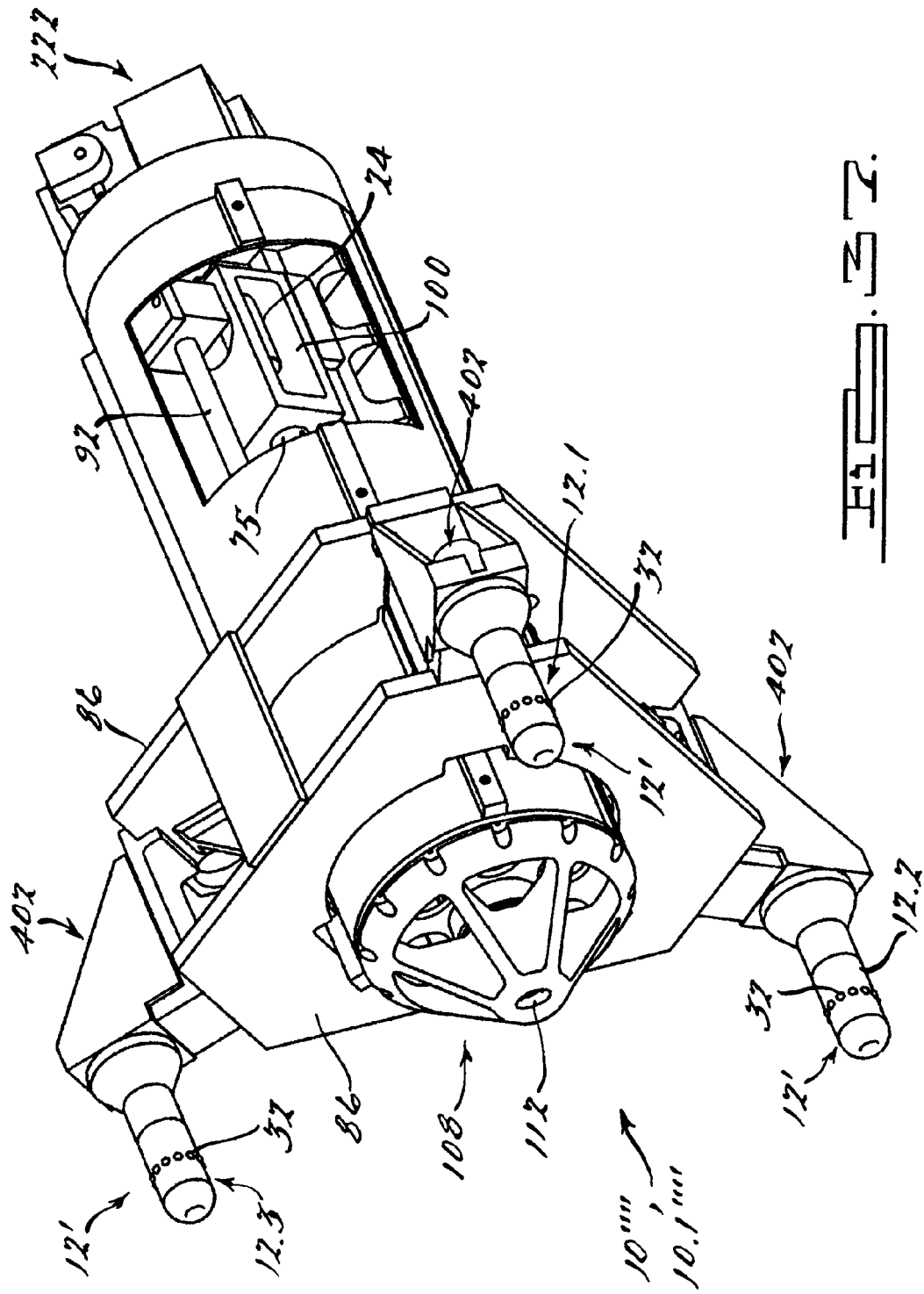

Referring to FIGS. 33 and 34, the ARD system 200' provides for rotational alignment of the chaser 200.1 and target 200.2 portions of the ARD docking system 200 after docking by a rotatable boom head 220 actively driven by a motor 222 mounted aft of the boom 210. After the rotatable boom head 220 makes hard contact with the primary target cone 208 of the target receptacle 224 of the target vehicle 3, the rotatable boom head 220 is rotated to index the ARD docking system 200 into proper rotational alignment. The rotatable boom head 220 can be rotated ±180 degrees so as to compensate for any rotational misalignment.

Referring to FIG. 34, the moving boom structure 210' on the ARD docking system 200 is supported from the mounting plate 226 by eight aluminum rollers 228 that lay in direct contact with the outside skin 230 of the boom structure 210'. Due to the appearance of some surface galling on the ARD boom structure 210', later designs included a V-groove and track roller system, similar to that of the ARD docking system 200 planned for orbit.

The three-point kinematic rigidization system of the second aspect described hereinabove, when used in cooperation with the ARD system 200', provides for relaxing the accuracy and repeatability requirements for the system associated with the rotation of the rotatable boom head 220 that would be otherwise required absent the cooperation of the first 106.1, second 106.2 and third 106.3 secondary target receptacles acting on the corresponding associated auto-alignment guideposts 104 that provide for relatively precise rotational alignment of the chaser 10.1" and target 10.2" portions of the docking system 10". The active rotational positioning capability of the ARD system 200' provides for relaxing some of the accuracy and repeatability requirements of the associated autonomous guidance, navigation and control system 9 when initially aligning the chase 1 and target 3 vehicles prior to the commencement of docking.

Referring to FIGS. 35 and 36, in accordance with a third aspect, the chaser portion 10.1''' of a docking system 10''' comprises one or two alignment posts 302 (wherein two alignment posts 302.1, 302.2 are illustrated in FIG. 36), each of which extends from an associated arm 304 operatively coupled to a mounting structure 86 adapted to mount the chaser portion 10.1''' of a docking system 10''' to the chase vehicle 1 and to support an associated main docking boom 84. Each tip of the alignment post 302 is adapted to cooperate with a pair of corresponding alignment guide ramps 306, having associated alignment surfaces, that annularly surround a primary target cone 110 of the target portion 10.2''' of the docking system 10''', and which slope in opposite directions towards an alignment location 308, wherein each pair alignment guide ramps 306 in cooperation with one another functions as a corresponding secondary target receptacle 106 adapted to receive and cooperate with a corresponding alignment post 302. The embodiment of FIG. 35 illustrates four different sets of alignment guide ramps 306.1, 306.2, 306.3, 306.4—each circumferentially spanning about 90 degrees—having four corresponding associated alignment locations 308.1, 308.2, 308.3, 308.4—each separated by 90 degrees. The alignment posts 302.1, 302.2 are illustrated extending forward parallel to the axis of the main docking boom 84, and when aligned with the corresponding alignment guide ramps 306.1 and 306.3, or 306.3 and, 306.4, provide for aligning the associated first 11.1 and second 11.2 roll axes of the chaser 10.1''' and target 10.2''' portions of the docking system 10''' in a common plane. The docking system 10''' illustrated in FIGS. 35 and 36 incorporates a Harpoon end effector 12 and associated docking cable 14 which operate in cooperation with the main docking boom 84 to achieve soft-dock and hard-dock as described hereinabove in accordance with the first and second aspects of the docking mechanism 10', 10". During the associated rigidization process, as the main docking boom 84 is retracted, prior to fully tensioning the docking cable 14—so that the boom head 108 can rotate within the primary target cone 110,—the alignment posts 302.1, 302.2 cooperate with associated corresponding alignment guide ramps 306.1 and 306.3, or 306.3 and, 306.4 so that the chase 10.1''' and target 10.2''' portions of the docking system 10''' become rotationally aligned as the tips of the alignment posts 302.1, 302.2 seek the associated alignment locations of the alignment guide ramps 306.1 and 306.3, or 306.3 and, 306.4. Alternatively, the third aspect of the docking mechanism 10''' can be adapted to operate without a moveable main docking boom 84, but instead relying strictly upon the docking cable 14 to pull the chase 1 and target 3 vehicles together. Furthermore, the third aspect of the docking system 10''' could alternatively incorporate a probe assemble 160 as illustrated hereinabove in conjunction with the second aspect of the docking system 10". The third aspect provides for potentially conserving space in a relatively smaller docking system 10''' with relatively reduced mass, however the overall rigidity of the resulting rigidized dock will depend upon the interface between the boom head 108 and the primary target cone 110, and may not have as much pitch or yaw stability as would be provided by the first or second aspects for which the associated auto-alignment guideposts 104 in cooperation with the corresponding secondary target receptacles 106 act with greater moment to restrict both pitch and yaw motion, than would the pair of alignment posts 302.1, 302.2 in cooperation with a pair of corresponding alignment guide ramps 306.1 and 306.3, or 306.3 and, 306.4, which act with a relatively smaller moment and restrict primarily only one of pitch or yaw motion.

Referring to FIGS. 37 and 38, an embodiment of a fourth aspect of a docking system 10'''' incorporates all of the features of, and operates in accordance with, the first aspect of the docking system 10' described hereinabove in respect of FIGS. 5-14, except that, for the chaser portion 10.1'''' of the docking system 10'''', the auto-alignment guideposts 104 of the first aspect are replaced with corresponding Harpoon end effectors/alignment guideposts 12.1, 12.2 and 12.3; and for the target portion 10.2'''' of the docking system 10'''', the pockets 115 of the secondary target receptacles 106 of the first aspect are replaced with corresponding Harpoon end effector receptacle 28.1, 28.2 and 28.3, each of which is structured and operates similar to the primary target receptacle 28, wherein a first Harpoon end effector receptacle 28.1 cooperates with a corresponding first Harpoon end effector/alignment guidepost 12.1, a second Harpoon end effector receptacle 28.2 cooperates with a corresponding second Harpoon end effector/alignment guidepost 12.2, and a third Harpoon end effector receptacle 28.3 cooperates with a corresponding third Harpoon end effector/alignment guidepost 12.3. If the Harpoon end effectors/alignment guideposts 12.1, 12.2 and 12.3 and Harpoon end effector receptacles 28.1, 28.2 and 28.3 are each equidistant from axes of the associated boom head 108 and primary target receptacle 28, respectively, and evenly spaced thereabout, then it will be recognized that any of the Harpoon end effectors/alignment guideposts 12.1, 12.2 and 12.3 could engage with any of the corresponding associated Harpoon end effector receptacles 28.1, 28.2 and 28.3. Each of the Harpoon end effectors/alignment guideposts 12.1, 12.2 and 12.3 cooperates with an associated actuator 402, for example, a solenoid actuator, a relatively fixed portion of which is operatively coupled to the mounting structure 86 by which the chaser portion 10.1'''' of the docking system 1'''' is mounted to the chase vehicle 1. The base 65 of the outer shell 30 of each Harpoon end effector/alignment guidepost 12.1, 12.2 and 12.3 is also operatively coupled to the same mounting structure 86. A relatively movable portion of each actuator 402 is operatively coupled to the base 63 of the actuator sleeve 60 of the corresponding associated Harpoon mechanism 12', for example, with either a control cable 22 or a control link, so as to provide for releasing and rearming the Harpoon mechanism 12'. The operation of the soft-docking and hard-docking processes of the fourth aspect of the docking system 10'''' is the same as described hereinabove for the first aspect of the docking system 10'. Following the hard-docking process, the main docking boom 84 is retracted by the associated ballscrew-driven boom drive actuator 74, thereby drawing the chase 1 and target 3 vehicles further together until the Harpoon end effectors/alignment guideposts 12.1, 12.2 and 12.3 of the chase portion 10.1 of the docking system 10 engage with the corresponding Harpoon end effector receptacles 28.1, 28.2 and 28.3 of the target portion 10.2 of the docking system 10, wherein upon sufficient engagement, the associated triggering pins 44 of the Harpoon end effector receptacles 28.1, 28.2 and 28.3 actuate the associated Harpoon mechanisms 12' of the Harpoon end effectors/alignment guideposts 12.1, 12.2 and 12.3, thereby causing the Harpoon end effectors/alignment guideposts 12.1, 12.2 and 12.3 to become captured by the associated capture rings 72 within the corresponding Harpoon end effector receptacles 28.1, 28.2 and 28.3. Thereafter, the Harpoon end effectors/alignment guideposts 12.1, 12.2 and 12.3 remain captured, even if tension is released in the docking cable 14. The docking system 10'''' may be further rigidized by either tensioning the docking cable 14 so as to fully seat the Harpoon end effectors/alignment guideposts 12.1, 12.2 and 12.3 within the corresponding Harpoon end effector receptacles 28.1, 28.2 and 28.3, or by extending the main docking boom 84 to as to preload the outer ball bearings 32 against the corresponding capture rings 72, wherein the latter approach provides for reducing the maximum loads in the docking cable 14, which reduces the necessary load capacity thereof, wherein the main docking boom 84 and associated hardware could then be adapted with sufficient capacity to carry the associated rigidization loads. In comparison with the second aspect of the docking system 10'', the third aspect provides for eliminating 3 translational degrees of freedom and 2 rotational degrees at each of the interface between the Harpoon end effectors/alignment guideposts 12.1, 12.2 and 12.3 and the corresponding Harpoon end effector receptacles 28.1, 28.2 and 28.3, so that this interface would be over-constrained, thereby reducing the tolerance for misalignment of the associated components.

Following docking, the chase 1 and target 3 vehicles are undocked by first releasing the rigidization forces of the Harpoon end effectors/alignment guideposts 12.1, 12.2 and 12.3 acting on Harpoon end effector receptacles 28.1, 28.2 and 28.3, either by releasing the tension in the docking cable 14, or by retracting the main docking boom 84, depending upon the source of effort for these forces. Then, each of the actuators 402 are actuated so as to tension the associated control cable 22 or control link, which pulls the actuator sleeve 60 of the associated Harpoon mechanism 12' back in its travel space, which then resets the Harpoon mechanism 12', allowing the outer ball bearings 32 to slide radially inward, thereby enabling the Harpoon end effectors/alignment guideposts 12.1, 12.2 and 12.3 to be released from the corresponding Harpoon end effector receptacles 28.1, 28.2 and 28.3 of the target vehicle 3, which occurs by extending the main docking boom 84, after which the Harpoon mechanism 12' of the central Harpoon end effector 12, if not already released, is released from the primary target receptacle 28 in accordance with same process as described hereinabove in respect of the first aspect of the docking system 10'.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. An automatically aligned docking system, comprising:
   a. a plurality of alignment posts associated with a first vehicle; and
   b. a plurality of receptacles associated with a second vehicle, one receptacle associated with each alignment post of the plurality of alignment posts, wherein said plurality of receptacles are arranged around a roll axis of said second vehicle, and some or all of the plurality of receptacles are differently shaped with respect to one another to constrain the corresponding said alignment posts in different degrees of freedom (DOF).

2. The system of claim 1, wherein one of the plurality of receptacles includes a conical detent pocket operative to constrain the corresponding associated alignment post in three degrees of freedom (DOF).

3. The system of claim 1, wherein one of the plurality of receptacles includes a V-shaped groove operative to constrain the corresponding associated alignment post in two degrees of freedom (DOF).

4. The system of claim 1, wherein one of the plurality of receptacles includes a flat plane, substantially perpendicular to an axis of the corresponding associated alignment post.

5. The system of claim 1, wherein each receptacle of the plurality of receptacles is located at a bottom of a conical guide ramp.

6. An automatically aligned docking system, comprising:
   a. three alignment posts associated with a first vehicle; and
   b. first, second and third receptacles associated with a second vehicle, each located at a bottom of a conical guide ramp, and each associated with a corresponding one of the alignment posts associated with the first vehicle, wherein, the first receptacle includes a conical detent pocket, the second receptacle includes a V-shaped groove, and the third receptacle includes a flat plane substantially perpendicular to an axis of the corresponding associated alignment post.

7. A second portion of a docking system adapted to dock with a first portion of the docking system, comprising:
   a. a first receptacle incorporating a conical detent pocket, wherein said conical detent pocket provides for constraining a corresponding first alignment post of the second portion of the docking system in three degrees of freedom;
   b. a second receptacle incorporating a V-shaped groove, wherein said V-shaped groove provides for constraining a corresponding second alignment post of the second portion of the docking system in two degrees of freedom; and
   c. a third receptacle incorporating a planar surface, wherein said planar surface is substantially perpendicular to a roll axis of the first portion of the docking system and provides for constraining a corresponding third alignment post of the second portion of the docking system in one degree of freedom.

8. A second portion of a docking system adapted to dock with a first portion of the docking system, as recited in claim 7, further comprising at least one of a first conical guide ramp leading into said first receptacle, a second conical guide ramp leading into said second receptacle, and a third conical guide ramp leading into said third receptacle.

9. A second portion of a docking system adapted to dock with a first portion of the docking system, as recited in claim 7, wherein said first, second and third receptacles are each substantially uniformly separated from one another.

10. A second portion of a docking system adapted to dock with a first portion of the docking system, as recited in claim 7, wherein said first, second and third receptacles are each substantially uniformly separated from said roll axis of the first portion of the docking system.

11. A second portion of a docking system adapted to dock with a first portion of the docking system, as recited in claim 7, further comprising a primary receptacle adapted to receive and releasably couple with an end effector, wherein said primary receptacle is adapted to receive said end effector along a roll axis of the docking system, and said end effector is associated with the first portion of the docking system, and said first, second and third receptacles are each distal relative to said primary receptacle with respect to said roll axis of the first portion of the docking system.

12. A second portion of a docking system adapted to dock with a first portion of the docking system, as recited in claim 7, further comprising a concave guiding surface concentrically surrounding said primary receptacle and adapted to mate with a corresponding convex boom head on a distal end of a docking boom associated with the first portion of the docking system so as to provide for aligning roll axes of the first and second portions of the docking system responsive to a tension between the first and second portions of the docking system following engagement of the end effector of the first portion of the docking system with said primary receptacle.

13. A first portion of a docking system adapted to dock with a second portion of the docking system, comprising:
   a. a first passive alignment post extending from a structure of the second portion of the docking system, wherein a distal end of said first passive alignment post is substantially hemispherical, said first passive alignment post extends along a first axis that is substantially parallel to a roll axis of the second portion of the docking system, and said substantially hemispherical distal end of said first passive alignment post provides for cooperating with a first alignment surface of a first receptacle in the second portion of the docking system;
   b. a second passive alignment post extending from said structure of the second portion of the docking system, wherein a distal end of said second passive alignment post is substantially hemispherical, said second passive alignment post extends along a second axis that is substantially parallel to said roll axis of the second portion of the docking system, and said substantially hemispherical distal end of said second passive alignment post provides for cooperating with a second alignment surface of a second receptacle in the second portion of the docking system; and
   c. a third passive alignment post extending from said structure of the second portion of the docking system, wherein a distal end of said third passive alignment post is substantially hemispherical, said third passive alignment post extends along a third axis that is substantially parallel to said roll axis of the second portion of the docking system, said substantially hemispherical distal end of said third passive alignment post provides for cooperating with a third alignment surface of a third receptacle in the second portion of the docking system, and an interaction of said first, second and third passive alignment posts with said first, second and third alignment surfaces provides for constraining exactly six degrees of freedom at the interface between the first and second portions of the docking system.

14. A first portion of a docking system adapted to dock with a second portion of the docking system as recited in claim 13, wherein said first, second and third passive alignment posts are each substantially uniformly separated from one another, and said first, second and third passive alignment posts are each substantially uniformly separated from said roll axis of the second portion of the docking system.

15. A first portion of a docking system adapted to dock with a second portion of the docking system as recited in claim 13, further comprising:
   a. an extendable tensile element adapted to be extended from and retracted towards or into the first portion of the docking system, wherein a first end of said extendable tensile element is operatively coupled to said first portion of said docking system; and b. an end effector operatively coupled to a second end of said extendable tensile element, wherein said end effector acts along a roll axis of the docking system, and said end effector is adapted to releasably couple with a primary receptacle associated with the second portion of the docking system.

16. A first portion of a docking system adapted to dock with a second portion of the docking system as recited in claim 15, wherein said extendable tensile element is flexible in transverse bending, further comprising:

a. a docking boom adapted to be extended from and retracted towards the first portion of the docking system, wherein said docking boom is substantially stiffer in transverse bending than said extendable tensile element;

b. a first actuator that provides for extending and retracting said docking boom from and towards the first portion of the docking system; and c. a second actuator that provides for extending and retracting said extendable tensile element from and towards the first portion of the docking system.

17. A first portion of a docking system adapted to dock with a second portion of the docking system as recited in claim 16, wherein said first actuator comprises ball screw mechanism operative between said docking boom and a structure of the first portion of the docking system.

18. A first portion of a docking system adapted to dock with a second portion of the docking system as recited in claim 16, wherein said second actuator comprises ball screw mechanism mounted within said docking boom and operative between said extendable tensile element and said docking boom so as to provide for extending and retracting said extendable tensile element relative to said docking boom.

19. A first portion of a docking system adapted to dock with a second portion of the docking system as recited in claim 16, wherein a distal end of said docking boom is terminated with a boom head adapted to mate with a corresponding guide structure associated with said primary receptacle associated with the second portion of the docking system.

20. A first portion of a docking system adapted to dock with a second portion of the docking system as recited in claim 19, wherein said boom head comprises at least a portion of a convex conical surface.

21. A first portion of a docking system adapted to dock with a second portion of the docking system as recited in claim 15, wherein said end effector comprises a latching mechanism capable of being armed and released from the first portion of the docking system, and automatically actuated responsive to an interaction of said end effector with a triggering element associated with the second portion of the docking system.

22. A first portion of a docking system adapted to dock with a second portion of the docking system as recited in claim 15, wherein said extendable tensile element is flexible in transverse bending, further comprising a spring-loaded probe assembly adapted to be translated along said roll axis of the docking system, wherein a probe head of said spring-loaded probe assembly is biased away from the first portion of the docking system, said spring-loaded probe assembly is substantially stiffer in transverse bending than said extendable tensile element; and a distal end of said spring-loaded probe assembly is terminated with probe head comprising at least a portion of a convex conical surface adapted to mate with a corresponding guide structure associated with said primary receptacle associated with the second portion of the docking system.

* * * * *